(12) United States Patent  
Fletcher

(10) Patent No.: US 7,980,616 B2
(45) Date of Patent: Jul. 19, 2011

(54) PICKUP TRUCK BED MOUNTED CHAIRS

(75) Inventor: Stephen Fletcher, Richmond, TX (US)

(73) Assignee: Lounge Crafters LLC, Houston, TX (US)

( * ) Notice: Subject to any disclaimer, the term of this patent is extended or adjusted under 35 U.S.C. 154(b) by 221 days.

(21) Appl. No.: 12/179,146

(22) Filed: Jul. 24, 2008

(65) Prior Publication Data

US 2010/0019523 A1    Jan. 28, 2010

(51) Int. Cl.
    *B60N 2/005*    (2006.01)
(52) U.S. Cl. .......................................... 296/64
(58) Field of Classification Search .............. 296/63, 296/64, 65.01, 65.03, 65.13, 66; 297/217.7, 297/232, 248; 248/214
    See application file for complete search history.

(56) References Cited

U.S. PATENT DOCUMENTS

| 2,799,321 | A |   | 7/1957 | Lilijengren |        |
|-----------|---|---|--------|-------------|--------|
| 5,301,998 | A |   | 4/1994 | Davis       |        |
| 5,306,072 | A |   | 4/1994 | Caldwell    |        |
| 5,516,179 | A | * | 5/1996 | Tidwell     | 296/63 |
| 5,529,375 | A |   | 6/1996 | English     |        |
| 5,951,103 | A |   | 9/1999 | Barnhill    |        |
| 5,957,530 | A |   | 9/1999 | Gutgsell    |        |
| 6,651,469 | B2| * | 11/2003| Arias       | 70/261 |
| 6,767,056 | B2|   | 7/2004 | Tseng       |        |
| 6,932,408 | B1| * | 8/2005 | Lyod et al. | 296/63 |
| 7,070,230 | B2|   | 7/2006 | Chen        |        |
| 7,159,939 | B2| * | 1/2007 | Brown et al.| 297/217.7 |
| 7,374,238 | B2|   | 5/2008 | Lingwall    |        |
| 7,434,861 | B2| * | 10/2008| Arias       | 296/63 |
| 7,497,514 | B2|   | 3/2009 | Ramsey      |        |
| 2004/0046428 | A1 |   | 3/2004 | Hwang    |        |
| 2004/0207240 | A1 |   | 10/2004| Tondino  |        |
| 2005/0140160 | A1 | * | 6/2005 | Arias    | 296/64 |
| 2007/0216187 | A1 | * | 9/2007 | Hyde     | 296/64 |
| 2008/0007082 | A1 | * | 1/2008 | Arias    | 296/63 |
| 2008/0067829 | A1 | * | 3/2008 | Arias    | 296/65.03 |

* cited by examiner

*Primary Examiner* — Hilary Gutman
(74) *Attorney, Agent, or Firm* — David McEwing

(57) ABSTRACT

The disclosure teaches a seating component device for removable installation in a pickup truck. The device includes a first bracket removeably attached to a first side panel of a pickup truck bed and a first cross rail and a second cross rail attached to the bracket wherein each rail extends laterally across the truck bed. The rails connect to a second bracket removeably attached to a second side panel of a pickup truck bed. The device includes two foldable chairs hingeably mounted to the second rail, and a table mounted between the two chairs.

11 Claims, 18 Drawing Sheets

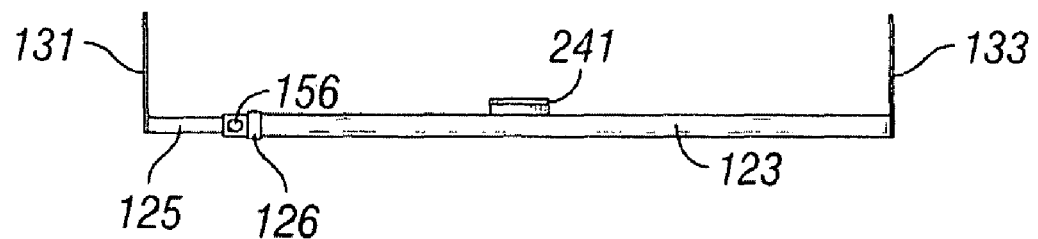
FIG. 18
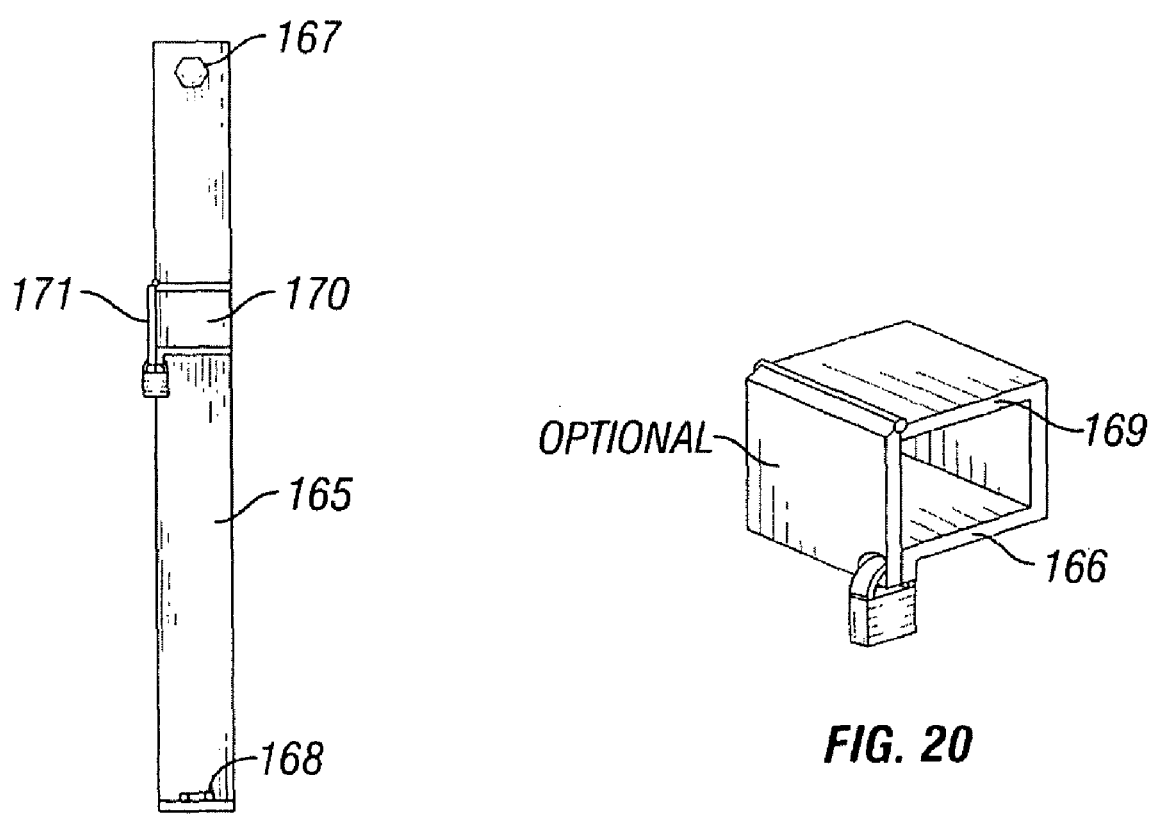
FIG. 19
FIG. 20

PICKUP TRUCK BED MOUNTED CHAIRS

BACKGROUND OF INVENTION

1. Field of Use

The device subject of this disclosure allows the truck bed to be used for recreational and leisure space. It provides a platform for fishing, camping, tailgating, hunting, star gazing or watching spectator sports.

2. Technical Field

At least one truck manufacturer in the past has offered seats mounted directly behind the truck cab and with the seat portion mounted directly to the bed of the pickup truck. This was designed to provide seating while the truck was in motion.

SUMMARY OF INVENTION

A seating device for removable installation in the bed of a pickup truck may comprise two L brackets fitting over a each side panel of a pickup truck bed and a first cross rail and second cross rail attached to each L bracket where each rail is mounted across the truck bed. Removeable installation may alternatively utilize vertical side brackets attached to the side panel of the pickup truck bed. The two horizontal rails suspended across the truck bed may be welded, bolted or otherwise attached to the above mentioned side brackets.

Also included may be an adjustable table with cup holders and an umbrella stand. Also included are two foldable chairs hingeably mounted to the second rail. The chairs are not intended to be used when the truck is in motion.

An alternate variation entails installing a track system on at least a portion of the inner pickup truck body and moveably mounting the device to the track.

Also included is a method of installing a chair device in a pickup truck bed comprising the steps of attaching a first bracket to the inside wall of a pickup truck bed panel with two attached rails, attaching the second side bracket also attached to the two rails onto a second side of the pickup truck bed.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 18 illustrates a side view of the device mounting system illustrated in FIGS. 1 and 2. Included in the illustration is the track for the adjustable table base and the reinforcing band.

FIG. 19 is a detailed view of a vertical support illustrated in FIG. 17. Also shown is the hinged cover plate to the "C" coupling.

FIG. 20 is a detail of the C coupling.

DETAILED DESCRIPTION OF DISCLOSURE

The device consists of at least one chair. The device will hereinafter be described as having two chairs. The chairs are foldable for storage including when the truck is in operation. The chairs may be recliners wherein the chair back can recline backward (preferably toward the truck cab) and a leg support extends upward.

Figure 1:
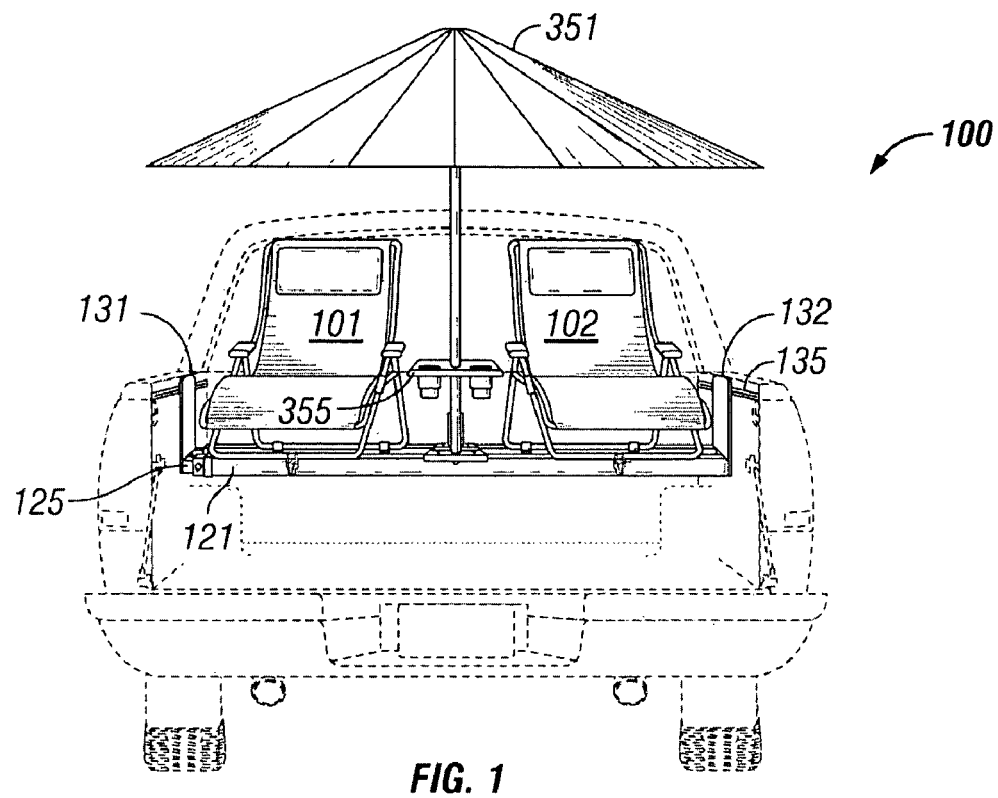
FIG. 1 illustrates the device viewed from the truck tail gate. The device is mounted on a track system. Illustrated are two chairs, table with cup holders, a portion of the rail system, umbrella and umbrella stand.

FIG. 1 illustrates the device 100. The chairs 101, 102 are mounted on a rail assembly consisting of a first rail 121 that spans the bed of the truck to an adjustable sleeve 125 and a second rail and sleeve (not shown). See FIGS. 21 and 22 for a detailed illustration of the operation of the sleeve and rail attachment. The rail and sleeve are attached to two side brackets that may be moveably attached to a track system 135. See FIG. 6 for a detailed illustration of the two side brackets moveably attached to the track system 135. The adjustable sleeve adapts the device to the differing width of pickup truck beds. For example, Chrysler and Dodge pickup trucks have a narrowing truck bed from front to rear. Many pickups have a truck bed of 58 inches or 63 inches in width. The device may be moved to different trucks.

Figure 3:
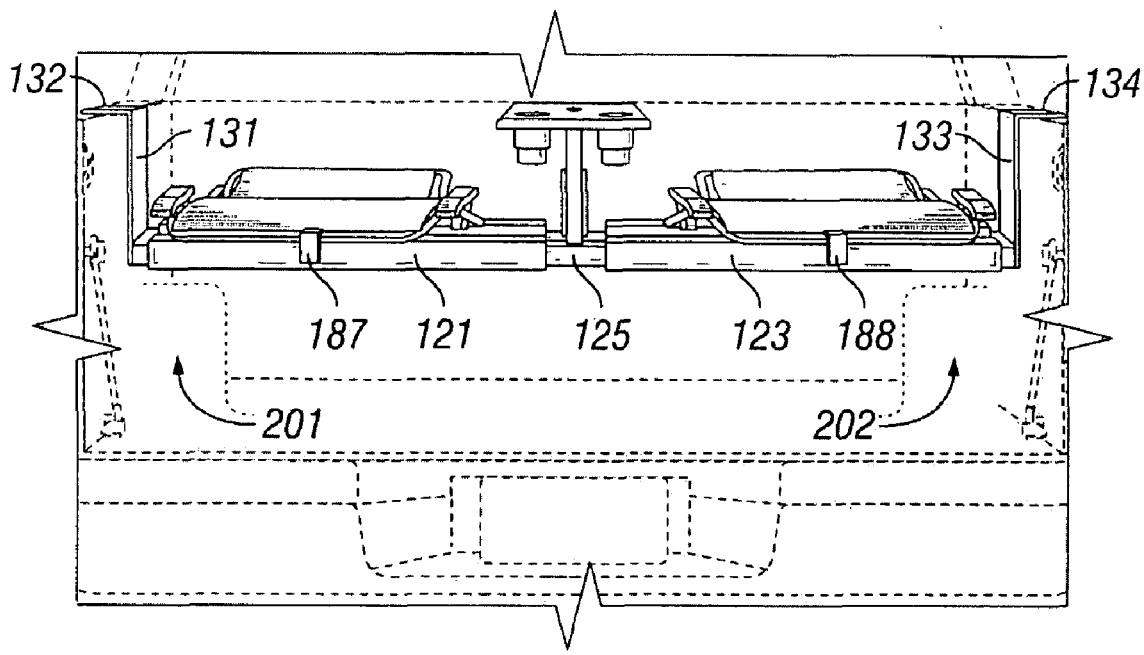
FIG. 3 illustrates the partially folded chairs and the table installed below the top of the truck bed body panels. The drawing illustrates an alternate method of mounting the device to the truck. Also illustrated are the chair frame catch brackets. Also illustrated is a 2 part rail support with connecting sleeve component.
Figure 8:
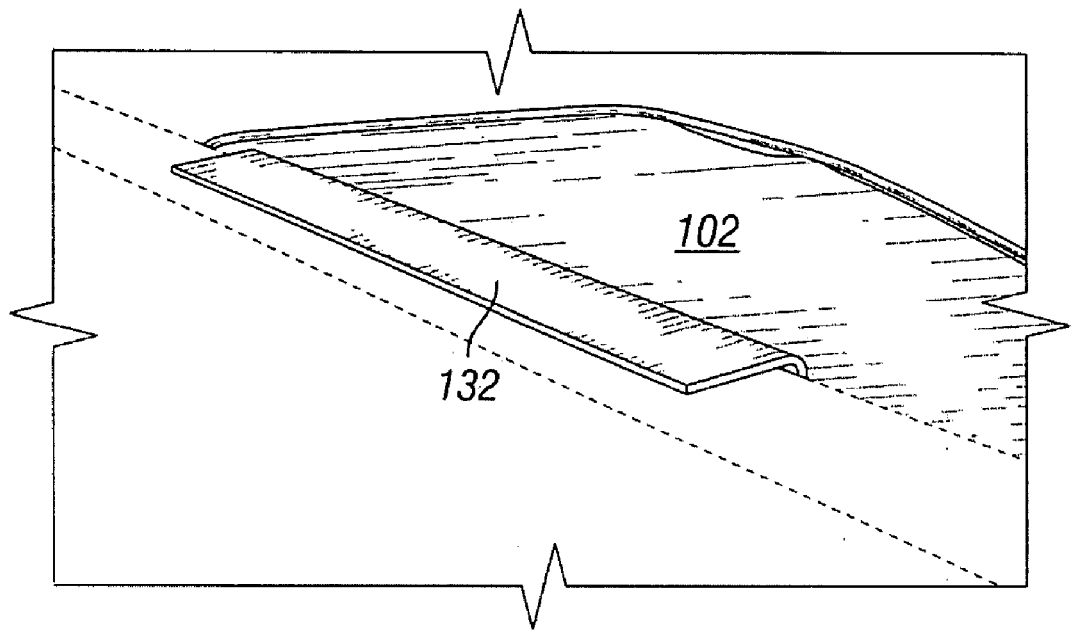
FIG. 8 illustrates a folded chair beneath the top edge of the truck bed body panel and the top of the inverted L bracket supporting the chair as illustrated in FIG. 3.

FIG. 3 illustrates an alternate inverted L bracket 132, 134 for mounting the device. The horizontal portion 132 of the L bracket rests on the edge or top of the truck bed panel as shown in FIG. 8. In one embodiment, (FIGS. 3 and 8) the rails are supported at each end by attachment to an L bracket 131, and L bracket top 132. There is an L bracket at each side of the truck bed. The top 132, 134 of the L bracket rests on the top of the truck bed body panel (shown in phantom). FIG. 3 also illustrates the other (bottom) arm 131, 133 of the L bracket extending vertically into the truck bed.

Figure 2:
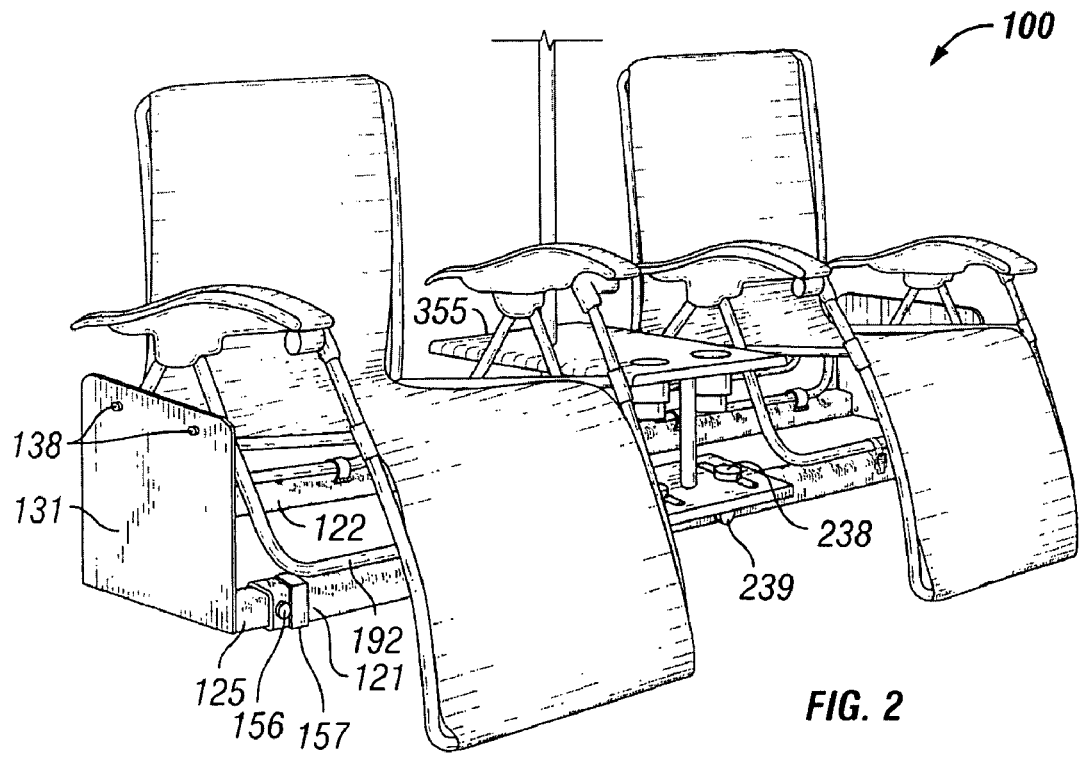
FIG. 2 illustrates a perspective view of the unfolded chairs, table, the rail system and the bracket for mounting the device on the track system mounted on the sides of the pickup truck body panels.

The side bracket illustrated in FIG. 1 and FIG. 2 is an alternate embodiment for the L bracket attachment component. The side bracket construction eliminates the horizontal flat portion of the L bracket (item 132 in FIG. 3) extending across the top of the body panel and facilitates the use of a pickup truck cover as discussed further herein.

The device may also include an umbrella 351 mounted to a table 355. It may also include an ice chest and a stereo system powered from the vehicle battery.

Figure 4:
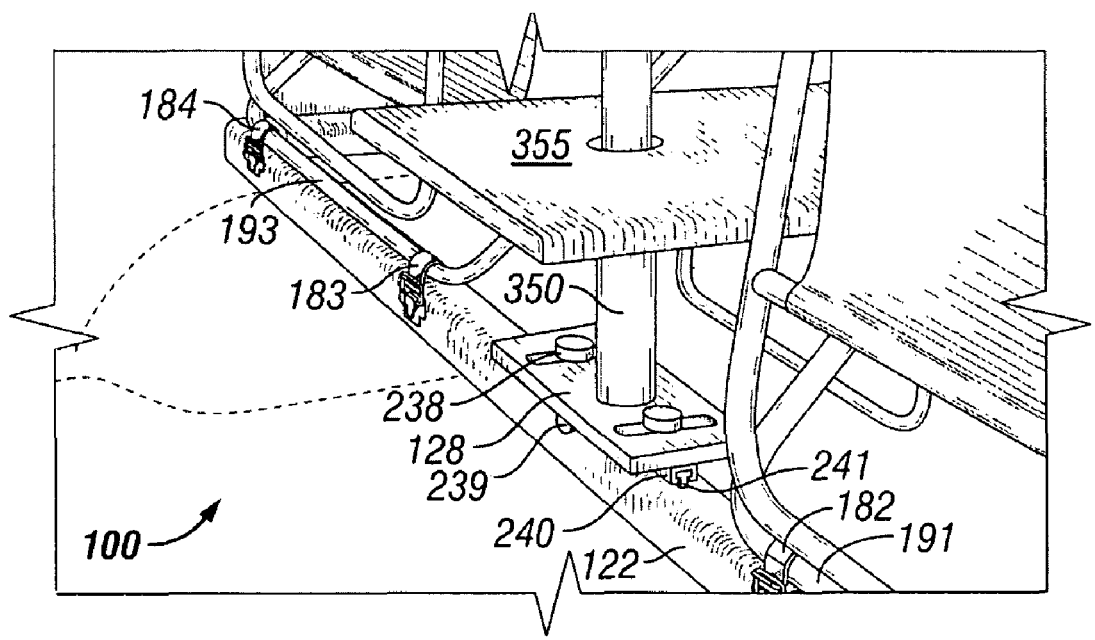
FIG. 4 illustrates the second rail showing the hinged latches holding the rear frame of the chairs. Also illustrated are the table and umbrella stand.

The rail assembly holding the chairs, table and umbrella can consist of a first rail and a second rail suspended above the truck bed. This is illustrated in FIGS. 2 and 4. FIG. 2 is a perspective view of the front of the device. The first rail 121 is shown. Also illustrated is the second rail 122 and the table 355. Also illustrated is one of two side brackets 131. Also illustrated are attachment mechanisms 138 for connecting the side brackets to a moveable truck track system or to the side of the truck bed panel. The bottom of the bracket is sufficiently wide for both the first and second rail to attach to the bracket with the spacing of the rail conforming to the bottom frame of the foldable chairs. In one embodiment, the spacing between the first rail and the second rail may be adjustable to accommodate differing sized chairs. In another embodiment, cross braces may be used to span the space between the first and second rail, thereby providing a support surface for the chair frame.

The first and second rail may be attached to the bottom of the side bracket in a variety of ways. One method is to have a male component that fits inside the interior diameter of the rail. Another embodiment comprises welding the rail to the side bracket. A threaded set screw attaching the rail to a protruding structure, e.g., sleeve component, from the side bracket may also be used. See FIGS. 21 and 22.

Figure 23:
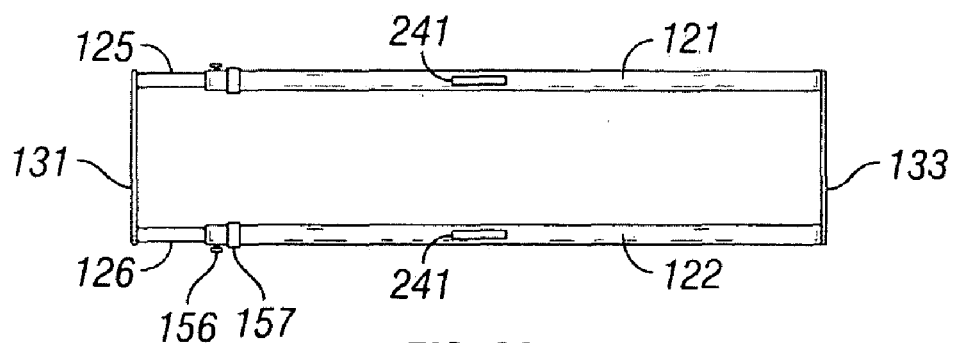
FIG. 23 is a top view of the front and back rails and the counter part sleeves and the side mounting brackets. Also illustrated are the two tracks in the rails allowing the table to be moved from side to side.

The two rail system 121, 122 and the complementary sleeve 125, 126 components are clearly shown in the top view illustrated in FIG. 23. Also illustrated in FIG. 23 are the side brackets 131, 133.

Figure 21:
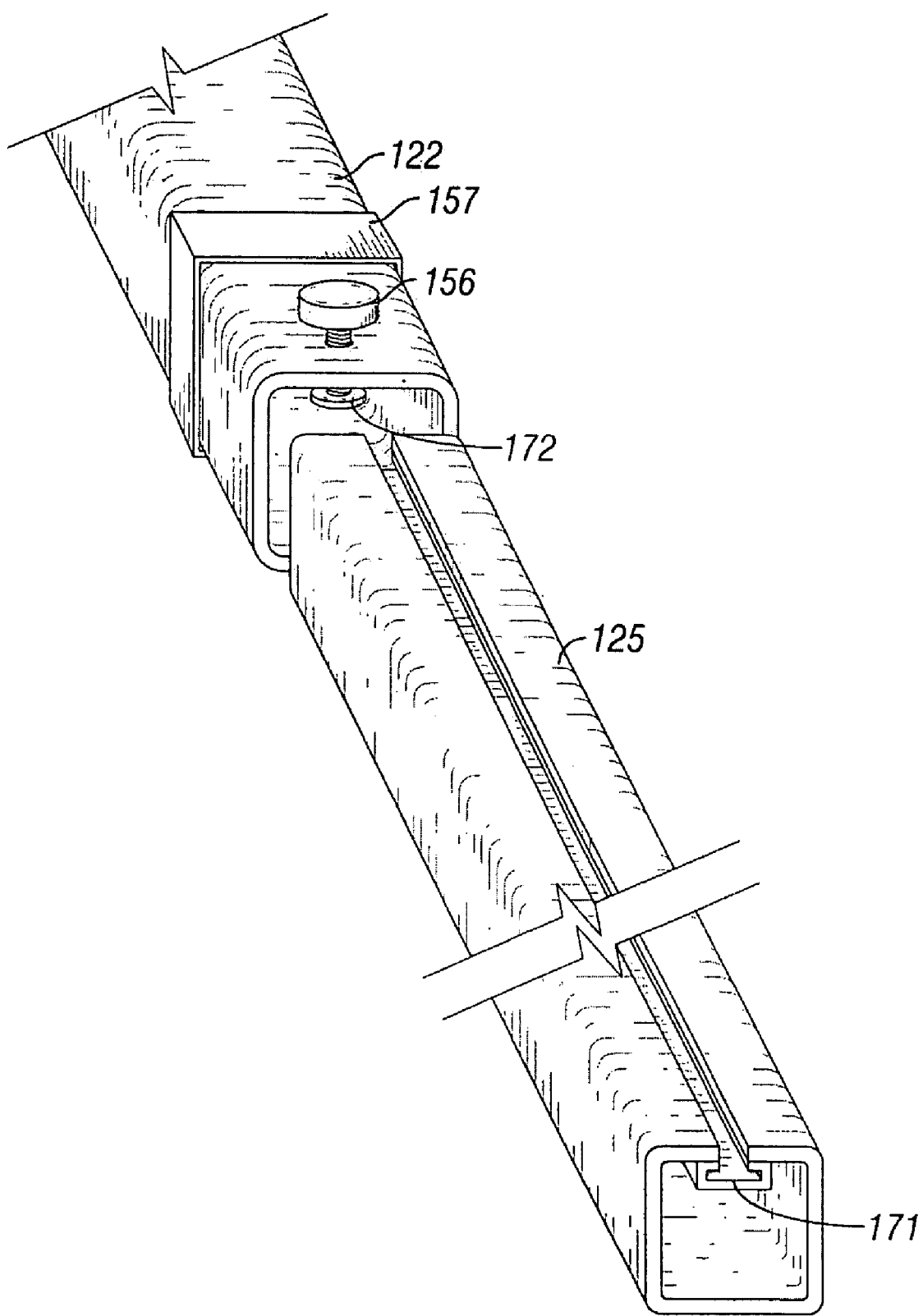
FIG. 21 is a detailed illustration of the adjustable connection mechanism of the rails supporting the chair, table and the sleeve.
Figure 22:
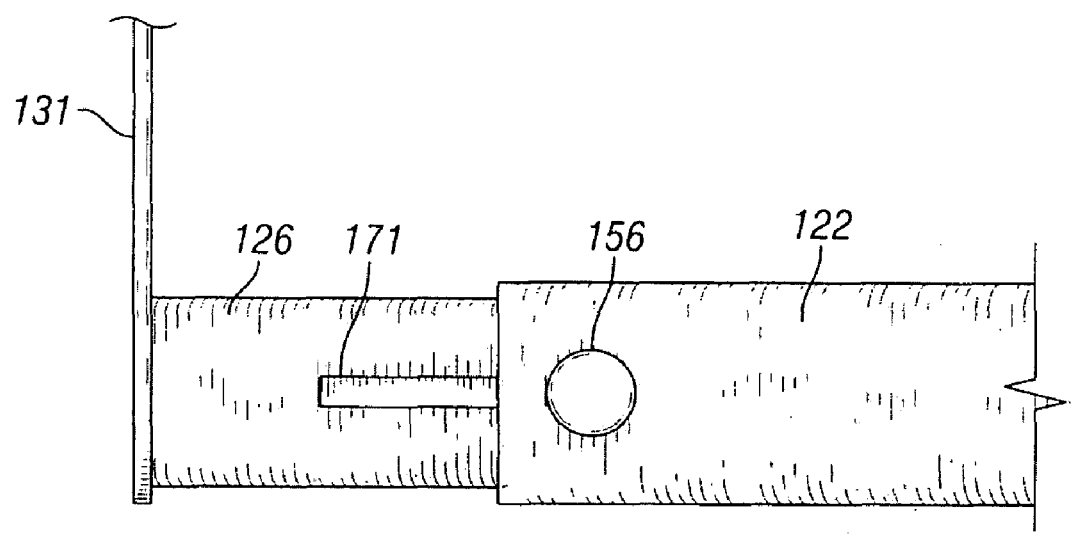
FIG. 22 is a top view of the connection between the rail and the sleeve showing the knob which can tighten the connection and the side bracket.

The sleeve 125 extends into the rail as shown in FIG. 21. The movement of the rail can be controlled by a manually operated knob 156 with an extension 172 that fits into a track 171 of the sleeve. To reinforce the rail-sleeve connection, one or more bands 157 can be optionally placed at the connection of the rail and sleeve. The bands go around the outside of the rail. Increasing the length of the sleeve extending into the rail will also increase the strength of the connection. FIG. 22 illustrates the sleeve 126 installed into the second rail 122 with the control knob 156 and track 171 of the sleeve. The side panel 131 is also illustrated.

Figure 14:
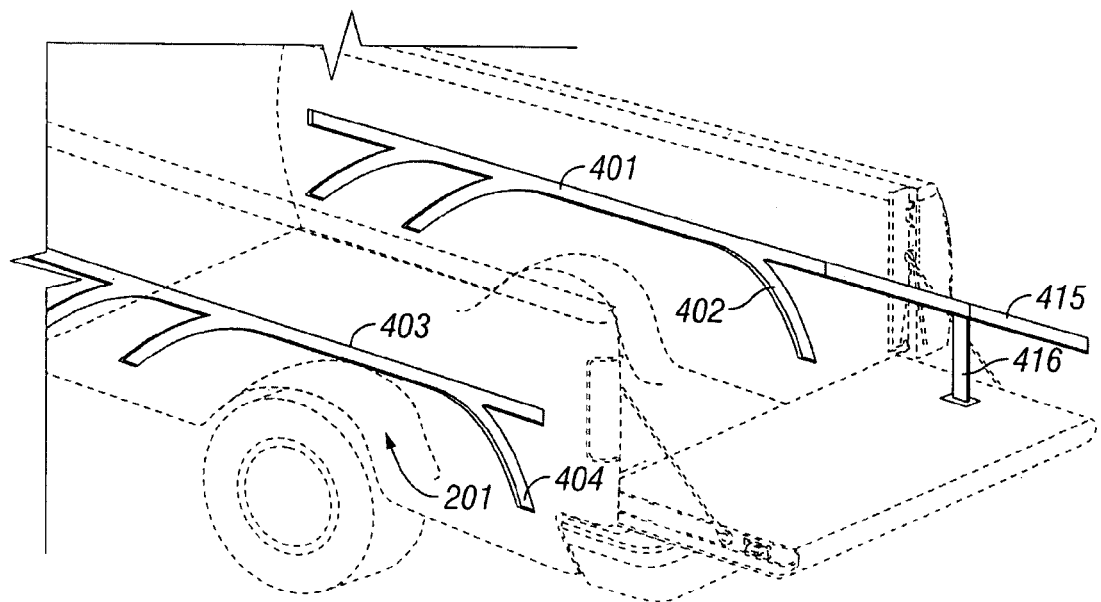
FIG. 14 illustrates a track system mounted inside the truck bed body panel.

The side brackets can be mounted to a track system that may extend all or partially of the length of the truck bed. FIG. 1 illustrates such a track system 131. FIG. 14 illustrates a different track system 401, 402, 403, 404. A truck bed track systems may be installed as original equipment by the vehicle manufacturer or furnished by an aftermarket vendor. Vehicle manufacturers have begun installing a track system mounted beneath the lip of the truck bed side body panel utilizing support brackets welded to the interior of the body panel. The side brackets of the device subject of this disclosure are adaptable to varying track attachment configurations.

Figure 15:
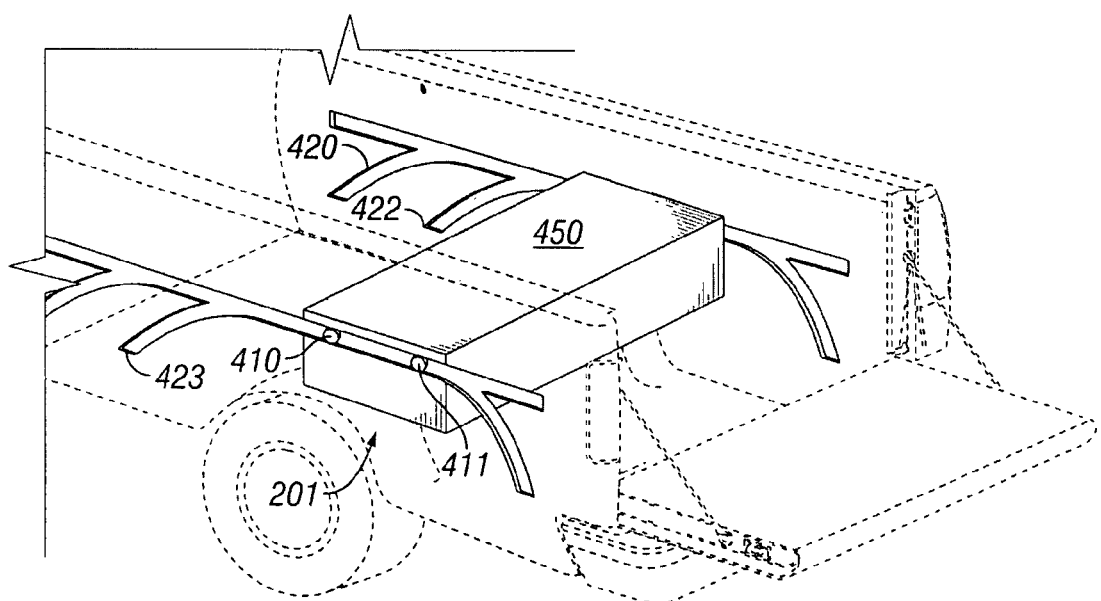
FIG. 15 illustrates a case mounted on the track system with rollers.

The device mounting mechanism can include rollers or similar mechanisms allowing the side brackets holding the device rails to be variably positioned in the truck bed. FIG. 15 illustrates an embodiment of a roller system 410, 411 conveying a case 450 containing the device of the disclosure.

FIG. 2 also illustrates the sleeve component 125 fitting inside the rail 121, the control knob 156, and the reinforcing band 157. FIG. 2 also illustrates the second rail 122.

FIG. 4 illustrates a perspective view of the reverse side of the device 100 and illustrating the second rail 122. Also illustrated are the hinged clasps 182, 183, 184 holding the back frame 191, 193 of the chairs to the second rail 122.

In one embodiment, the side brackets (or L brackets) and rails fit over the wheel wells of the truck bed. This is illustrated in FIG. 3 wherein the wheel wells 201, 202 are shown in phantom. However, the side bracket and rail assembly illustrated in FIG. 1 allows the device to be placed in any location within the truck bed.

The brackets and rails can be easily removed from the truck bed by reversal of the operation discussed below. In one embodiment, the bracket and rails are made of aluminum. The light weight facilitates installation and removal. As described below, the bracket and rails are assembled and dissembled from several components and further facilitates ease of removal and assembly.

In one embodiment, a rail, sleeve and bracket assembly accommodates the varying width of pickup truck beds. This is accomplished by a two part rail structure. In FIG. 3, this is illustrated by the two rail components 121, 123. The first side 121 of the first rail extends approximately to the middle of the truck bed. The rails are hollow. In one embodiment, they have a square cross sectional shape. The rails may be round or other shape. A sleeve 125 can fit inside or over the first side of the first rail. The sleeve preferably has a compatible cross sectional shape. The second side 123 of the first rail extends from the opposite side of the truck body. The sleeve can be inserted into the first side 121 sufficiently that the second side 123 can be lined up with the first side 121. The sleeve 125 can then be partially removed from the first side 121 and the sleeve also inserted into the second side 123. It will be appreciated that the sleeve has comparable structural strength with the rail. The sleeve is capable of sliding in and out of each rail.

Figure 6:
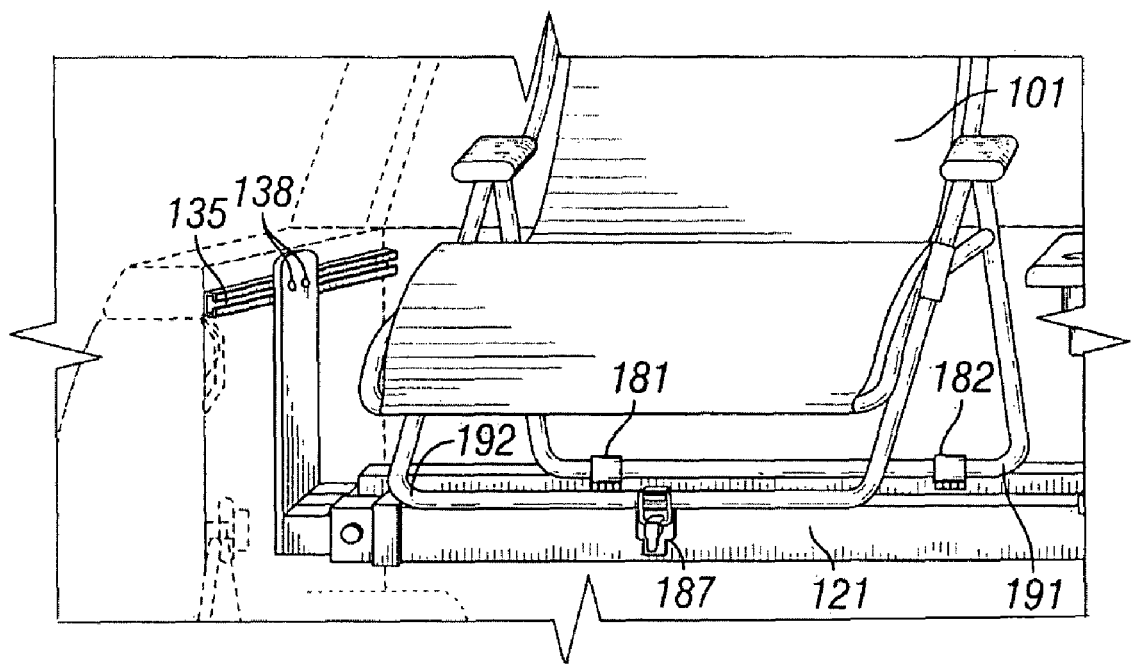
FIG. 6 is a perspective view of an unfolded chair showing the two hinge brackets on the second rail, the modified front and rear chair legs, the front chair latch, the first rail and side bracket.

For the embodiment illustrated in FIGS. 1 and 2, one side bracket 131 may be detached from the track 135 by removal of the two attachment mechanisms 138 illustrated in FIG. 6. The knobs 156 of the rails can be loosened and the sleeve 125 pushed further into the rail 121,122. The second side bracket 132 may be detached from the track and the device removed from the truck.

For the embodiment consisting of two vertical supports (see FIGS. 17 and 19) the covering plate 171 of the C coupling 170 is raised and the devise can be pulled horizontally out of the attachment mechanism and removed from the truck.

For some pickup trucks the distance between the side panels of pickup truck beds are not uniform with the front (proximate to the cab) and the back (ending at the tailgate). The trucks narrow proximate to the tail gate. Therefore the above mentioned first rail may be shorter than the second rail. This changing width dimension may require a beveled edge of the rail end meeting the side bracket.

In another embodiment, a brace connects the first and second rail. This brace can be used to mount a table.

In another embodiment, the rail component comprises a frame for attaching the rails for the chairs and other components such as a table and umbrella stand. This frame can be mounted directly to the truck bed. It may be mounted to the bed between the truck cab and the wheel well or between the tail gate and the wheel well. FIG. 15 illustrates the frame 190 spanning the wheel wells with two C shaped brackets. The frame material may be C channel shaped metal, e.g., aluminum. The wheel wells 201 are shown in phantom in FIG. 15.

Figure 17:
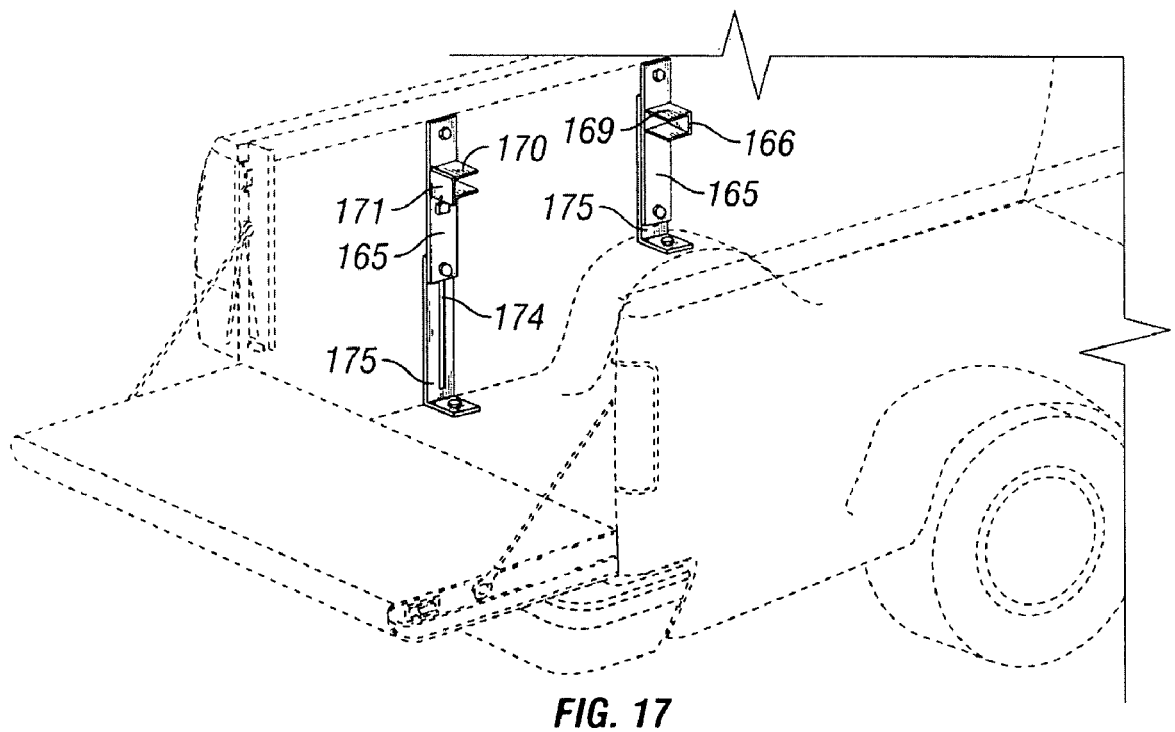
FIG. 17 illustrates an alternative device mounting system comprising two height adjustable vertical supports attached to each side of the inside truck body panel.

FIG. 17 illustrates an additional embodiment for supporting the device within the truck. The embodiment utilizes two vertical upright brackets 165 on each side of the truck bed. Each bracket is mounted 167 to the lip of the body panel or component fitted within the lip of the body panel. Each bracket is also mounted on the truck bed 168. Each bracket may comprise two parts that allow the height of the bracket to be adjustable. Each bracket contains a coupling component that is compatible with the device rail or sleeve. The front coupling (closest to the truck cab) may be a C coupling 166. The back bracket (closest to the tailgate) has an open C coupling 170 with a flap side closure 171 as illustrated in FIG. 19.

The two cross rail attachment component should have sufficient strength to hold the weight of two adults without bending. The weight capacity should be 800 lbs. In one embodiment, a folding leg (not shown) may extend from the rails or sleeve to rest upon the truck bed to reduce the weight load existing at the middle of the frame.

The rail mounting component (side bracket or component mounted to the bed) may further include a mechanism that allows the attached rails to be raised or lowered. This may consist of a plurality of vertically oriented slots with an adjacent vertical pathway. Each slot can hold a rail end. The rail end can be moved from and into differing slots via the vertical pathway.

The rails may also be adjusted horizontally. Movement may be in both directions, i.e., horizontal or vertical. Movement may be accomplished by attaching the side rails to a 2 piece side component. One piece is attached to the truck bed panel. This piece may contain 2 threaded protrusions that match channels within the second piece (attached to the rails). The second piece fits on the first piece. The second piece can be firmly fixed to the first piece by compression controlled by handles or knobs tighten onto the threaded rods. The second piece has vertical and horizontal channels on which the second piece can be maneuvered when the knobs are loosened. The movement of this side component can be controlled by the hand turned knobs. Tightening the knobs compresses the side attachment and immobilizes the rails.

In another embodiment, each rail end includes a gear in communication with a crank and optional second toothed structure. Turning the crank turns the rail end gear that moves along a vertically oriented toothed bar to raise or lower the rail.

Similarly, the rail mounting component may contain mechanisms for moving the rails forward or backwards in the truck bed. This can comprise notched openings connected to an upper horizontal pathway such that the weight of the rails, chairs, table and umbrella secure the rails in the lower notches. Alternatively, the track mounting component can comprise a track with rollers. The track can be attached to the rollers. The track is horizontally oriented. The component also contains a latching or locking mechanism.

As illustrated in FIG. 14, in another embodiment, the tracks 401,403 could include a curve or downward radius 402, 404.

In another embodiment, the track system could be extendible over the tail gate to facilitate loading of the case containing the device or other items, e.g., tools, etc. The track system could be supported by folding legs 416 or other supports resting on the open tail gate surface. When the case was moved into the bed of the truck, the legs or supports could be folded up and the extendible track 415 retracted into the truck bed. In another embodiment, the track extender could fit over the section 401 mounted in the truck bed. Illustrated in FIG. 14 is an optional track extender 415 and support 416 used to load or unload cases from the tailgate. The rail extender can be removed to allow the tailgate to close.

Referencing FIG. 15, the device 450 of the disclosure could be positioned low 420, 422, 423 in relation to the truck bed surface by placement at the bottom of the downward track radius. It will be appreciated that the distance between the curved track equals the width or spacing of the rollers 410, 411 attached to the case. It could be moved on the tracks up and over the wheel wells and again lowered on the track. See FIGS. 15 and 16. It will be further appreciated that multiple cases may occupy the track system and their order or orientation could be changed. For example, a case of tools could be moved to the cab end of the track 401, 403 and a separate case moved from the lower curved section 420, 422, 423 to the position over the wheel wells. For example work items could be positioned in the back of the truck for work purposes. However on the weekend, the tool case could be rolled to the cab and the seat device subject of this disclosure could be elevated and enjoyed.

Figure 16:
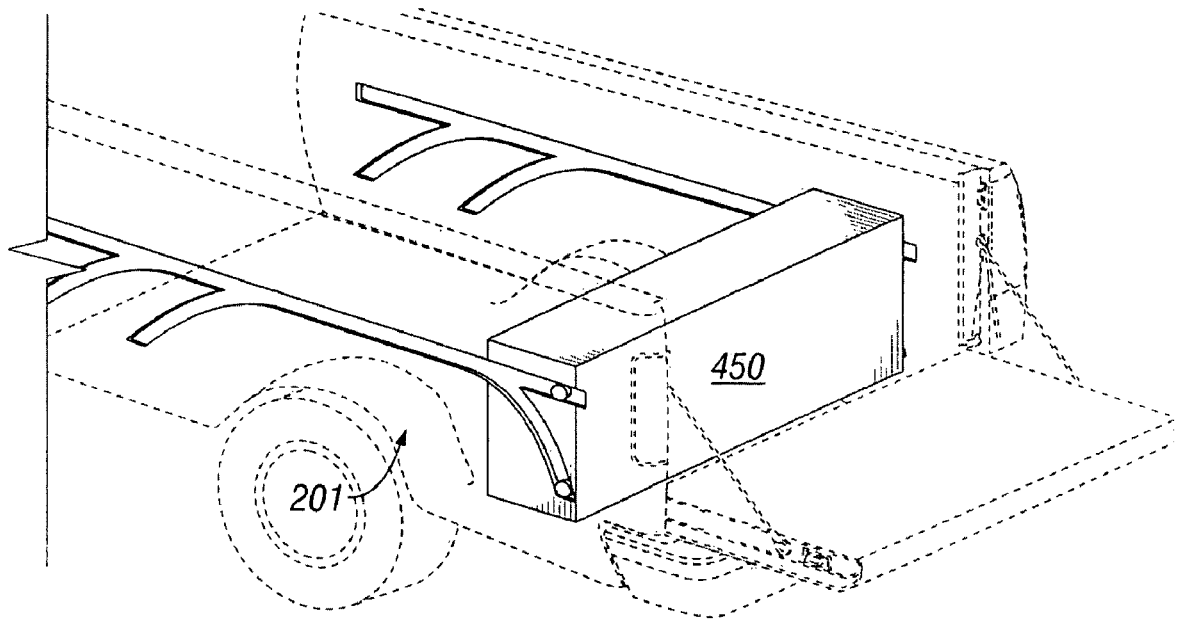
FIG. 16 illustrates the case placed in an alternate vertical position at the tailgate.

FIGS. 15 and 16 also illustrate the change in orientation of the case 450 from a horizontal position in FIG. 15 to a vertical position in FIG. 16. This change in orientation utilizes the track system having a radius. Note in one embodiment, the end of the case must be supported as it passes over an opening in the track. See for example the connection of the straight section 401 and curved portion 402, i.e., having a radius.

It will be appreciated that the cases 450 may also contain tools or other items and are not limited to the device subject of the disclosure.

One embodiment of the invention is that the chairs, table, umbrella and frame (aluminum rails, etc.) may be weather proof. The chairs may comprise modified outdoor furniture. Referencing FIGS. 4, 5B, and 6 the modification may comprise altering the chair frame 191, 192, 193 to accommodate the chair being mounted on the rails above the truck bed. As indicated, the metal components may be aluminum or stainless steel to eliminate rust. Wood components can be treated or finished for weather proofing or be weather resistant wood species.

In yet another embodiment, the rail mounting components holding the rails and the chair frames may be dimensioned to allow the folded chairs to be below the height of the truck side panel. This will minimize wind resistance. It will also allow a lockable and removable flat cover to be installed over the truck bed, i.e., a cover that maintains the height of the truck side panel over the truck bed. Other covers such as cab covers can also be utilized. Placement of the device in such lowered position is facilitated by the track mechanism, the side brackets or the 2 piece side supports.

Figure 9:
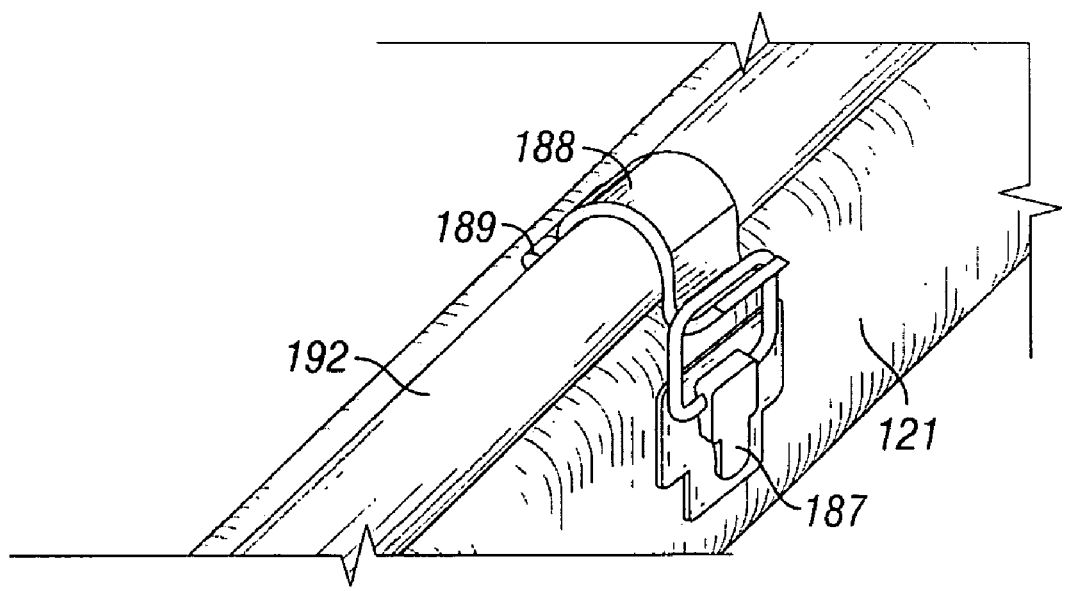
FIG. 9 is a perspective detail view of the hinged front chair latch to hold the front leg of the chair to the first rail.

The rails mounted above the truck bed hold the chairs mounted in the back of the pickup truck. In one embodiment, the base of the back chair frame 191, 192 is hingeably attached 182, 183, 184 to the second rail. The attachment also incorporates a latch mechanism that requires the hinge component to be placed over the chair base and attached to the latch component. This anchors the chair to the second rail. This mechanism is also shown in detail in FIG. 9 wherein the hinge 189, fixed to the rail 121, attaches the moveable strap component 188 that fits over the chair frame 192. The strap is latched to a latching component also fixed to the rail.

The sleeve 125 extending within the 2 part rail 121, 123 (FIG. 3) may contain a channel to allow the two rail portions to be moved together to facilitate removal and installation of the device. The channel may accommodate a chair hinge fastener mechanism. The front chair frame is dimensioned to fit on the first rail. In this embodiment, the first rail 121 has at least one catch mechanism 187 to hold the front chair frame 192 from tipping back as the chair may recline and the occupant's weight shifts in the chair. In another embodiment shown in FIG. 6, a releasable latch 187 or screw mechanism may be used to secure the front chair frame to the first rail. The releasable latch 187 holding the chair frame 192 is attached to the first rail 121. The two hinged latches 181, 182 holding the back chair frame 191 are also shown along with the side bracket, bracket attachment 138 and track system 135.

In the preferred embodiment, the bottom back chair support frame rests on the second rail and the front bottom chair support rests on the first rail.

Figure 5A:
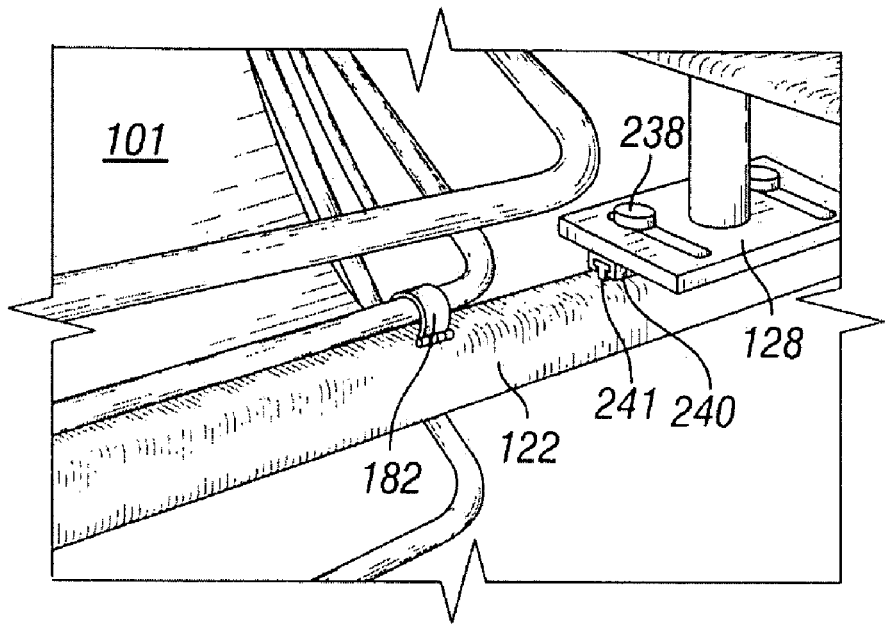
FIGS. 5A and 5B are details of the second rail and the chair hinge and latch attachments.
Figure 5B:
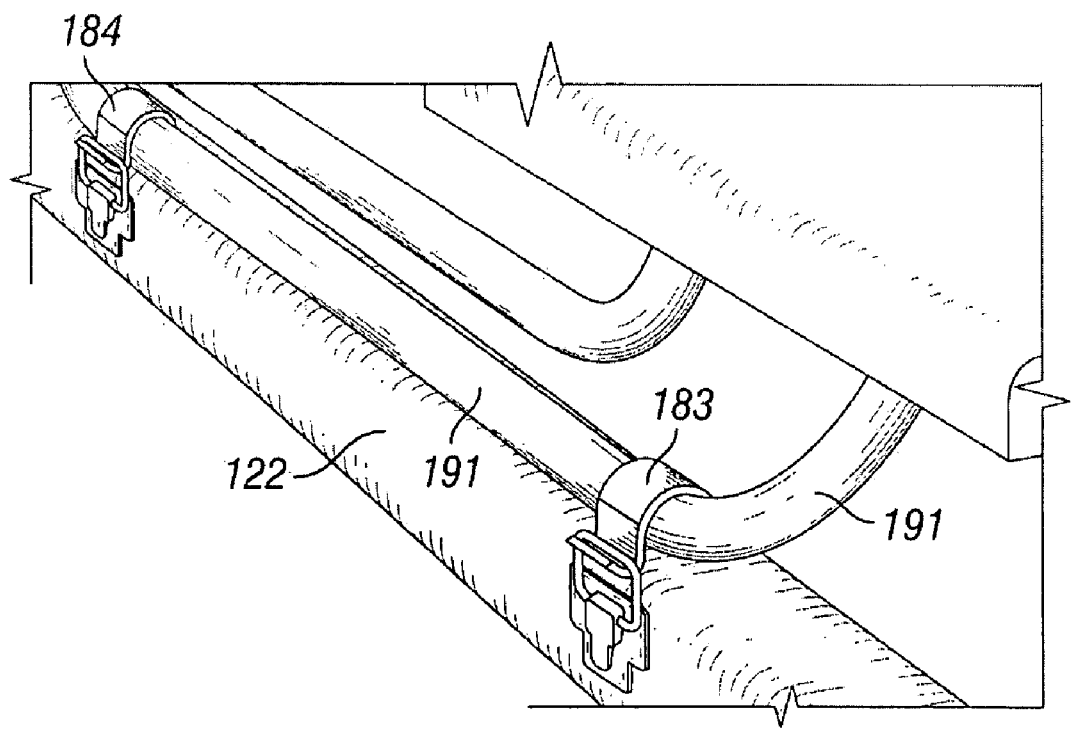
Figure 32:
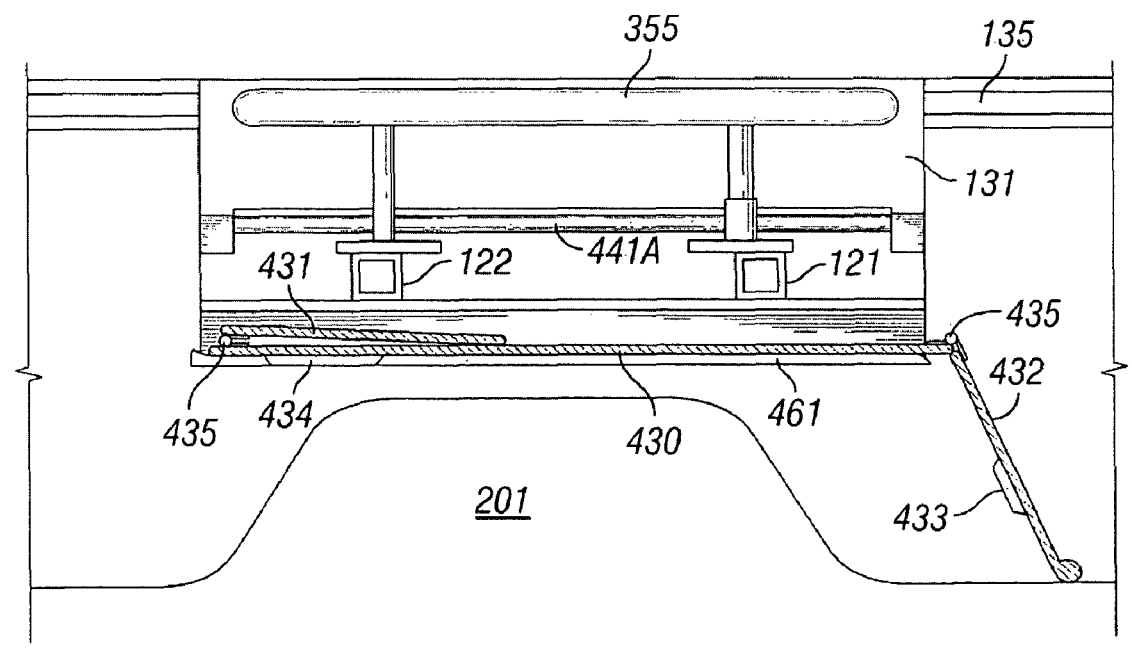
FIG. 32 is another cross section view of the device cover showing the cover stored underneath the rails on a lip constructed on the side brackets.

As illustrated in FIGS. 5A, 5B and 6, the chairs 101 can be pivoted on the hinges 182 of the second rail 122 to allow access rails or floor of the truck bed or stored device cover (see FIG. 32). The disclosure also includes an embodiment where the hinge strap is clamped in place by a latch device. See FIG. 5B. In one embodiment, each chair folds on itself. The chair back can be first raised and the leg rest or leg extension (optional) can be unfolded. The back of the rear facing chair is folded last to minimize wind resistance. Also illustrated in FIG. 6 are the side bracket, track 135 and bracket attachment mechanism 138.

Figure 7:
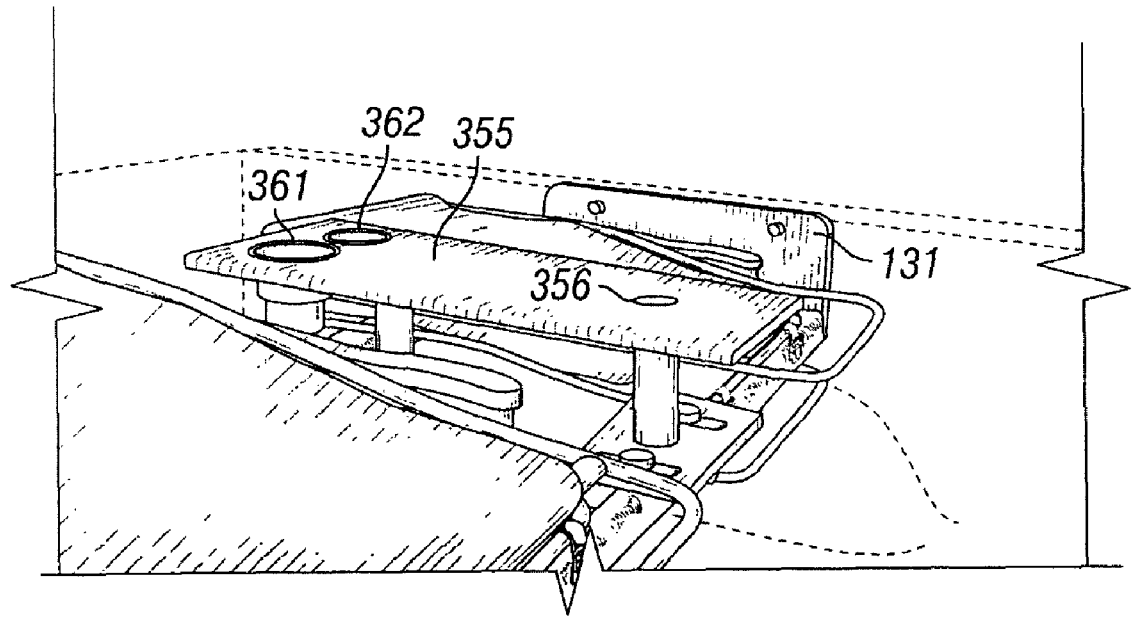
FIG. 7 illustrates a perspective view of the folded chairs, the adjustable table with cup holders, umbrella stand and the side bracket.

A table, console or cooler can be mounted between the two chairs. The table 355 is illustrated in FIG. 7. It can be mounted on a cross brace (not shown) joining the rails. The table may contain cup holders 361, 362. It may also include an umbrella stand 356. Also shown is a side bracket 131.

The umbrella stand can be an opening in the top of the table and extending to an annulus within a table support legs. The diameter of the annulus is compatible with the diameter of the umbrella pole. The umbrella stand may include an extension attachment to increase the height of the mounted umbrella. The umbrella stand may be integrated into the structural table support extending from the cross brace.

Figure 24:
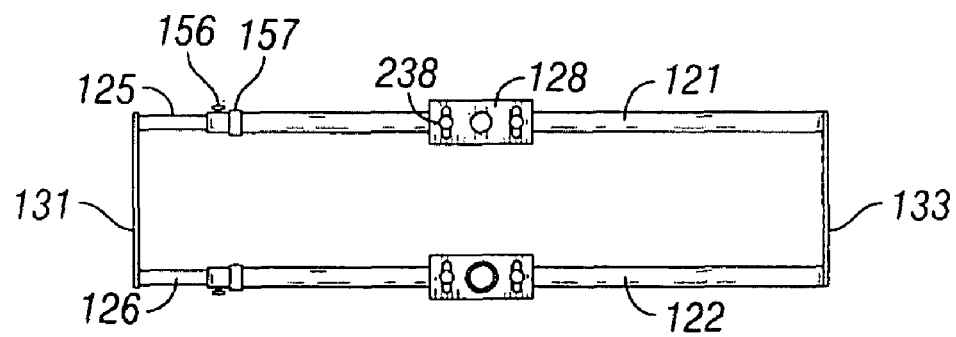
FIG. 24 illustrates the top view showing the table base and mechanism allowing the table to move forward and backward.

In the embodiment illustrated in FIGS. 1, 2, 4 and 7, the table is adjustable. FIG. 18 is a side view of the rail and side bracket system. Included in the illustration is a raised T track component 241. FIG. 23 is a top view of this same system and shows the top of the T track 241. FIG. 24 illustrates the two plates that fit over track 241. FIG. 4 is a perspective view and shows the T track 241 with the complementary receiving track 240. This combination allows the table base to slide in the direction of either chair. The movement is controlled by a knob 239 illustrated in FIG. 4.

The embodiment of the table also includes mechanism for movement forward (toward the truck cab) and backward (toward the tailgate). The movement is controlled by two vertically oriented knobs 238 within slots in the table base. The knobs are threaded into holes within the inverted U channel 240 and extending to the T track. When the knobs are tightened down, the table base is pressed to the T track component. This prevents the table from moving.

Figure 12:
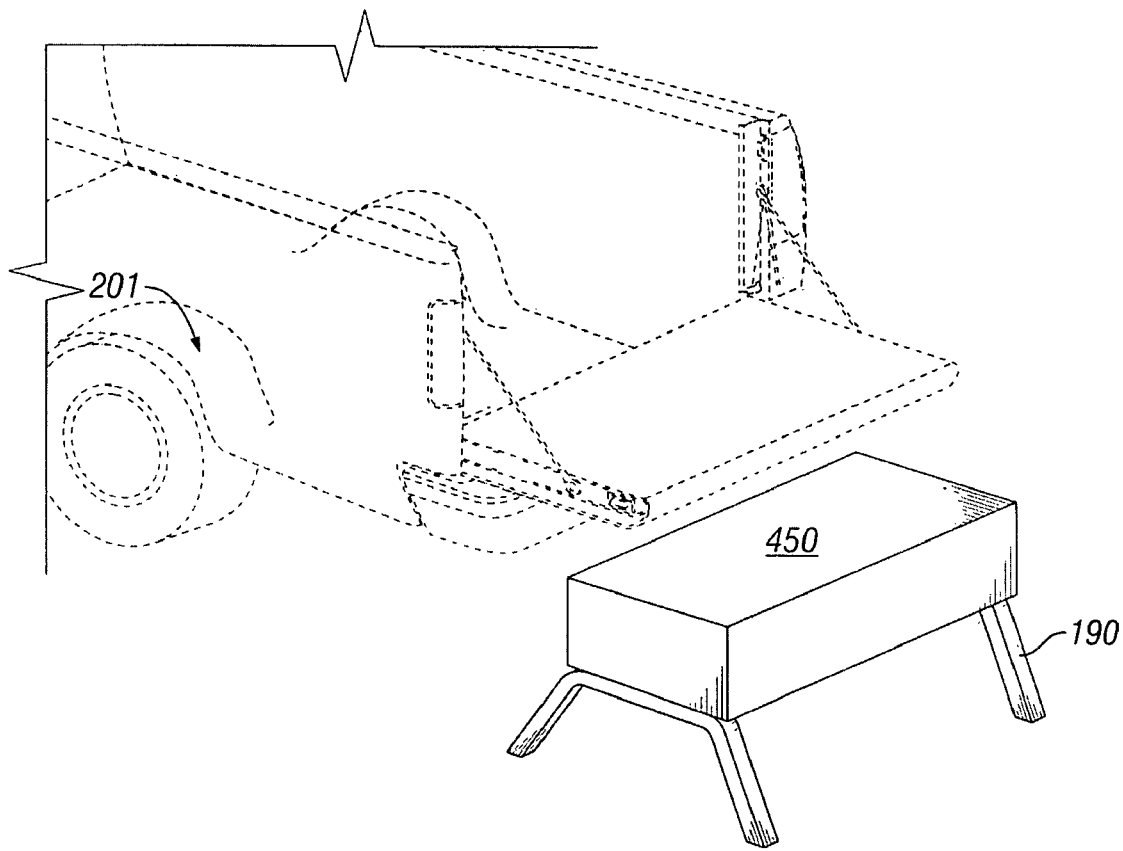
FIG. 12 illustrates a case that may hold the device located on a portable stand.
Figure 13:
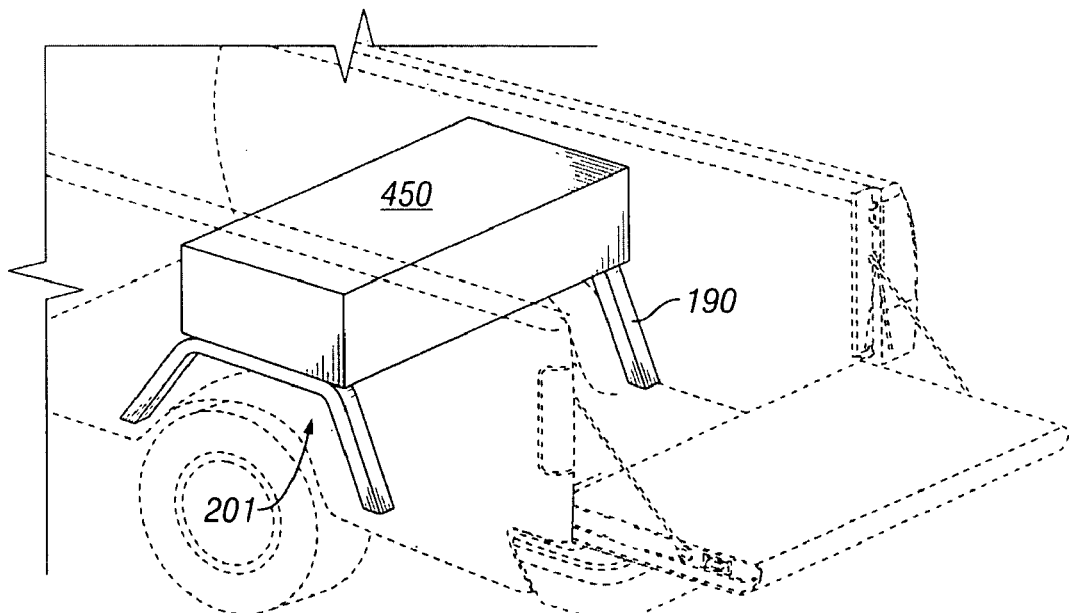
FIG. 13 illustrates the stand mounted in the truck and holding the case.

In another embodiment, the device is enclosable within a case stored in the back of the pickup truck. Essentially, it consists of a removable or secure case comprised of one or more foldable chairs or recliners, umbrella and a table between or on the sides of the chair that may have cup holders. The case could be secured to the tail gate directly bolted or secured in a removable configuration. The case can also be bolted to a 'C' style frame over the wheel well as shown in FIG. 13. The case can be attached to a slide system as shown in FIG. 15. The slide system secured to the sides of the bed which would allow adjustment of the device forward or backward in the truck bed and securing the device in a selected position with a locking key. The case could also be removed for use outside the vehicle as well as shown in FIG. 12. There could be legs 190 on the bottom of the case frame 450 to provide this setup configuration. The user would therefore have the option to use the chair, umbrella and table secured in the back of the truck bed or remove the case from the truck and set up the chairs, umbrella and table on the ground. Recall the in one embodiment, the frame is made of aluminum, thereby reducing the weight of the device to facilitate portability.

In an optional embodiment, a weather-proof case material could contain the chairs and table. If a fabric application is used then it could be removed during use or folded back. If a polyurethane or metal material is used then it could also be removed or folded back or split in the middle to be folded underneath the unit containing the chairs and table. Additionally available is a locking option for security to lock case top and or case to the truck frame.

A simple folding chair application or a sophisticated high quality folding recliner or zero gravity style application may be used. The chairs may be secured to the case frame and contained within the case when closed.

Figure 10:
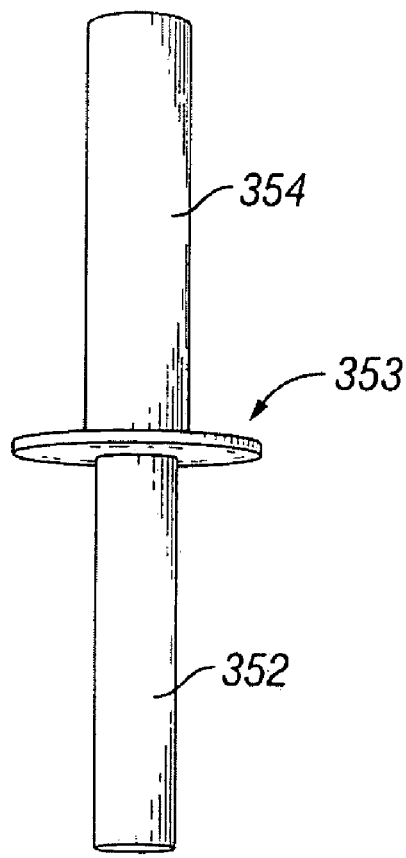
FIGS. 10 and 11 are alternate views of an umbrella stand adaptor allowing larger diameter umbrella poles to be used with the device.
Figure 11:
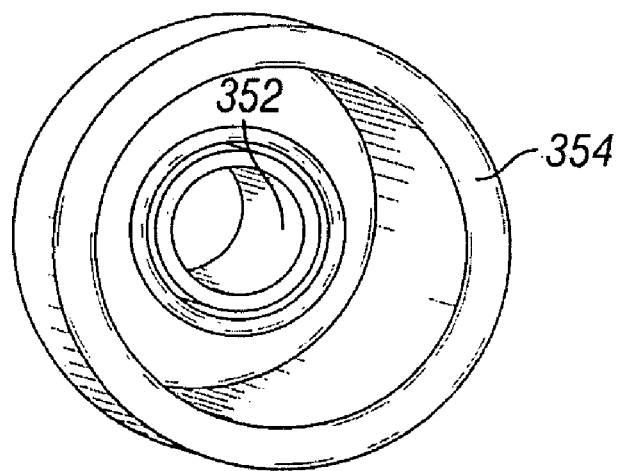

The unit may include a simple flat table on the side or between the chairs that may have cup holders and secured umbrella. Referencing FIGS. 10 and 11, the device may optionally include an umbrella stand extender 353 that fits within the umbrella stand within the table and extends out above the table to hold the umbrella. This raises the height of the umbrella. The umbrella stand extender may also allow a wider diameter umbrella pole to be used. This is illustrated in FIGS. 10 and 11 wherein the top annulus 354 is larger than the lower annulus 352.

A simple umbrella or stylish market style umbrella could be secured to frame or table. The securing of the umbrella must be sufficient to withstand acceptable wind resistant restrictions. This could channel the umbrella pole through the back of the table down through or on the case frame to provide sufficient bottom support for the umbrella.

The case could be bolted directly on rollers and track system that is secured on the sides of the truck body panel. The locking and securing of the case is accomplished by a through pin style configuration that could go through the rollers or simply through the frame itself. The channel could have a top or bottom notch that would allow the case to be removed from the roller and track system.

A frame would span the wheel well and the case could be attached to the frame, e.g., bolted, locked or latched, that would allow ease of removal of the case from the truck.

The system would be secured to the sides of the vehicle via latching, clamping or bolting. The case is secured to the slide rail system or track system and then can be positioned forward or backward. The case frame would lock in place at the desired position. The locking and sliding is accomplished by a through pin style configuration that could go through the rollers or simply through the frame itself. The channel could have a top or bottom notch that would allow the case to be removed from the roller and track system.

This track embodiment also can be used to mount and arrange multiple tool boxes or other containers adapted to attach to the track system installed in a pickup truck. See FIG. 15.

Figure 25:
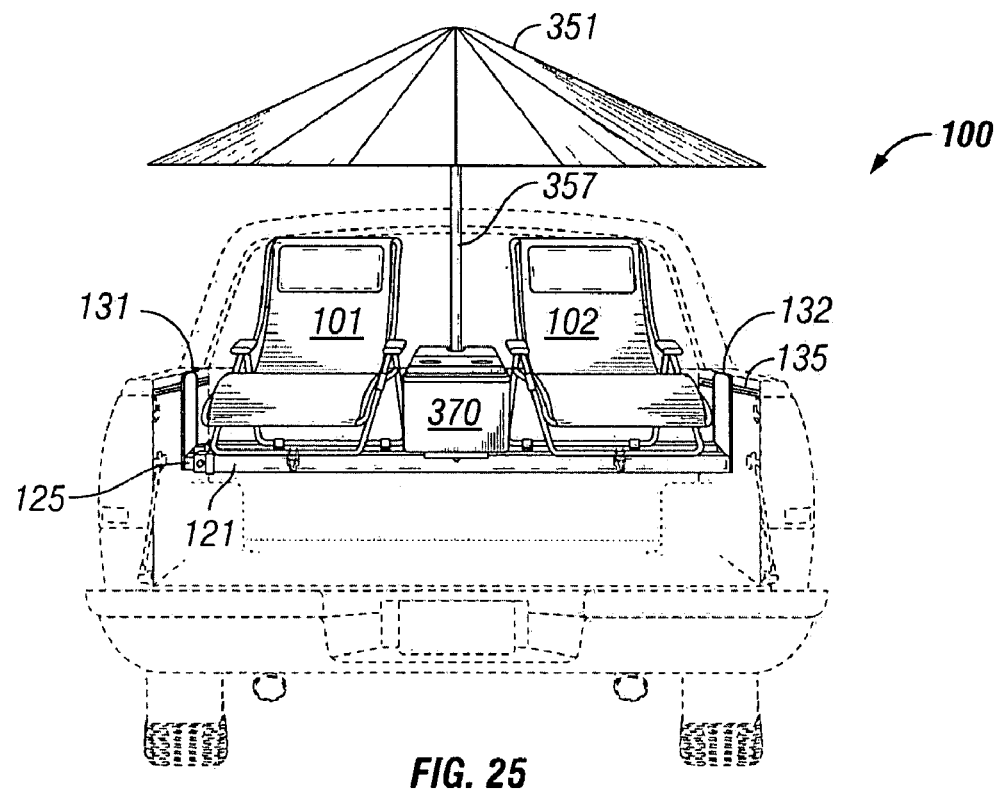
FIG. 25 illustrates the back of a pickup truck containing two chairs, an umbrella and an ice chest. The track system connected to the side brackets of the device is also illustrated.
Figure 26:
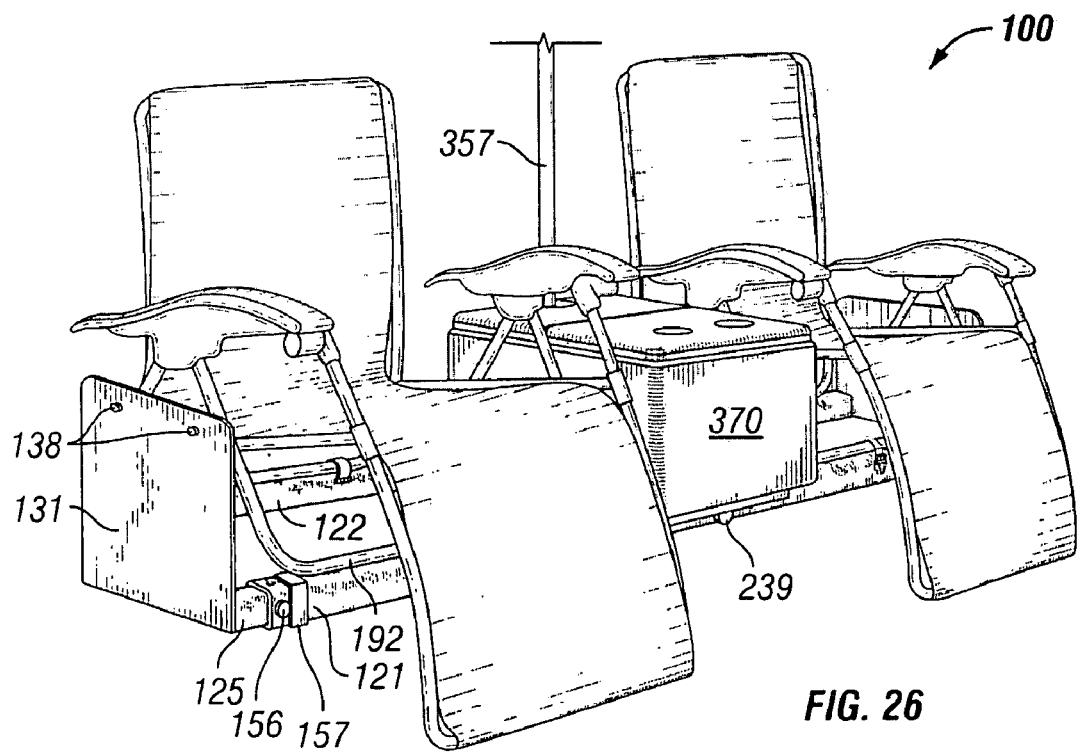
FIG. 26 illustrates a perspective view of the device including the ice chest placed in lieu of a table.

As previously mentioned, the device may incorporate an ice chest. FIG. 25 illustrates one embodiment wherein an ice chest 370 is substituted for a table. The ice chest is positioned between the chairs 101,102. The ice chest is supported by the rails 121. The rails are connected to side brackets 131, 132 removeably mounted in a moveable track system 135. Also illustrated is the umbrella 351 and umbrella pole 357. FIG. 26 is a perspective view of the ice chest incorporated into the device including an umbrella and umbrella pole 357. The frame comprising 2 rails 121, 122 and sleeve 123 are also illustrated along with the control knob 156 and reinforcement bands 157. Also illustrated is the control knob 239 for moving the ice chest laterally.

Figure 27:
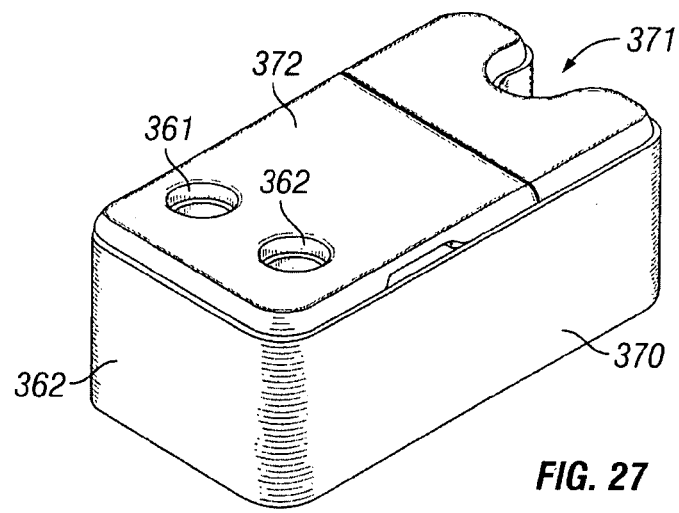
FIG. 27 illustrates the ice chest incorporating cup holders and an indentation at one end to accommodate an umbrella pole.

FIG. 27 is a perspective view of the ice chest 370 illustrating the indentations in the cover 372 for cup holders 361, 362 and the indentation 371 for accommodating the umbrella pole.

Also discussed is an embodiment where the device is held in a case that can be utilized in the truck or removed from the truck. See for example FIGS. 12 and 13. In another embodiment, the device (rails, chairs, ice chest or table, and umbrella) can be covered by a component that latches to the device.

Figure 28:
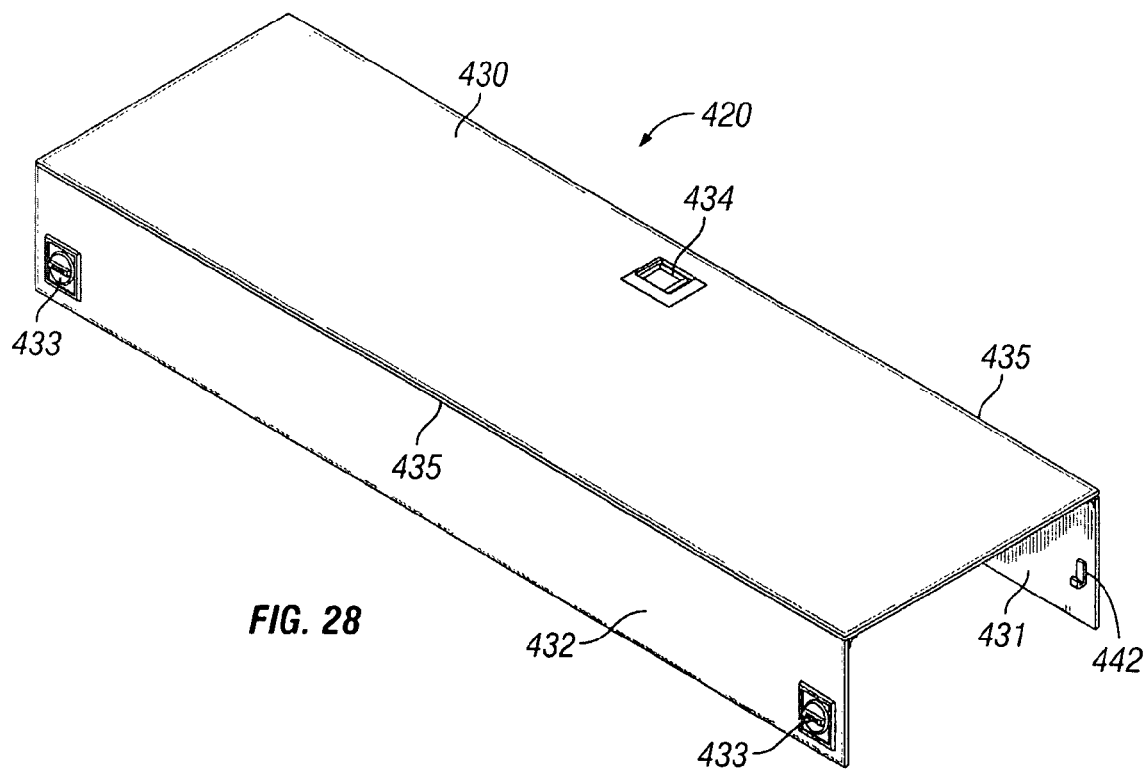
FIG. 28 is a perspective view of a cover for the device and illustrating a handle and locking mechanism.

FIG. 28 is a perspective view of the cover 420. The cover comprises a top 430 hingeably connected 435 to two sides 431, 432. The cover is preferably a non corroding metal such as aluminum. There is a handle 434 on the top. In the embodiment illustrated, there are two locking mechanisms 433 located on each corner of the back cover side 432 (most distant from the truck cab).

Figure 29:
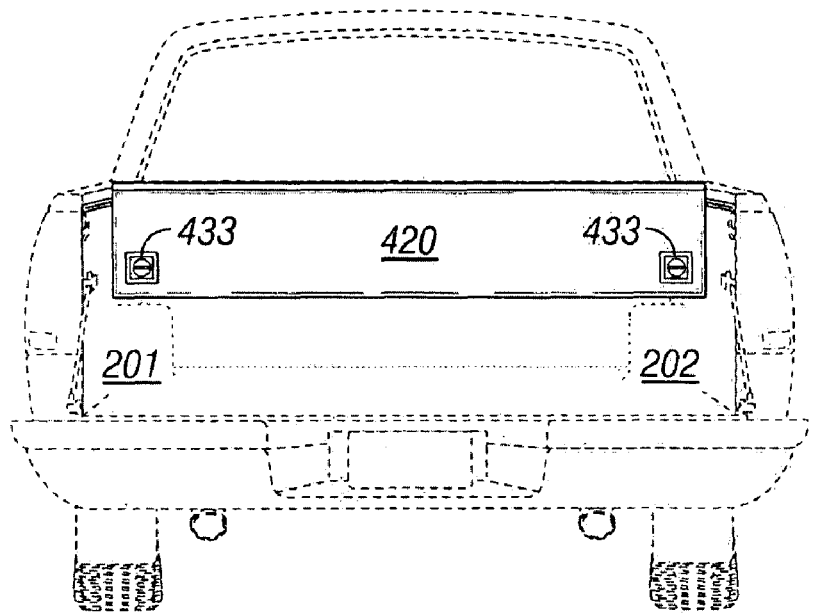
FIG. 29 illustrates a rear view of a pickup truck showing the device cover.
Figure 30:
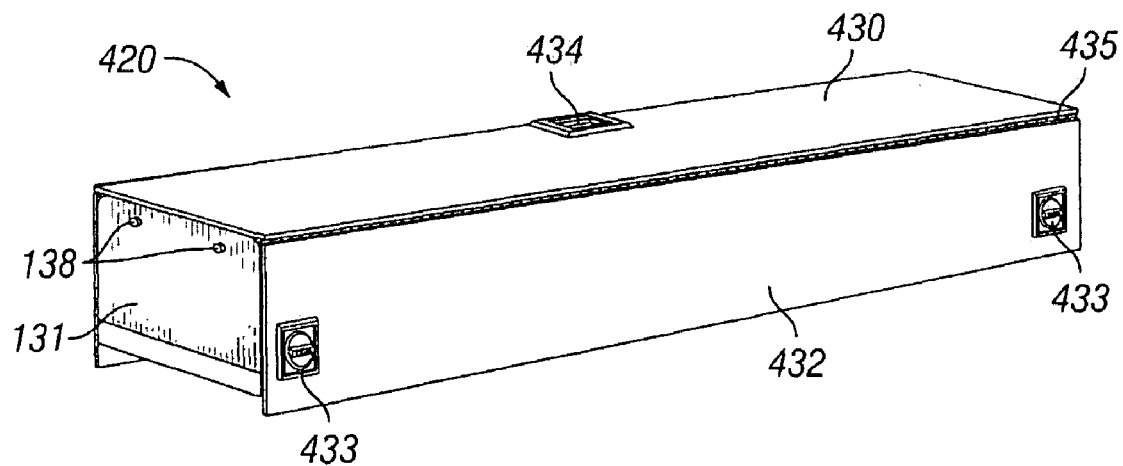
FIG. 30 illustrates a perspective view of the device cover including the hinged connection between the cover sides and the cover top. Also illustrated is the relationship between the side bracket and the cover.
Figure 31:
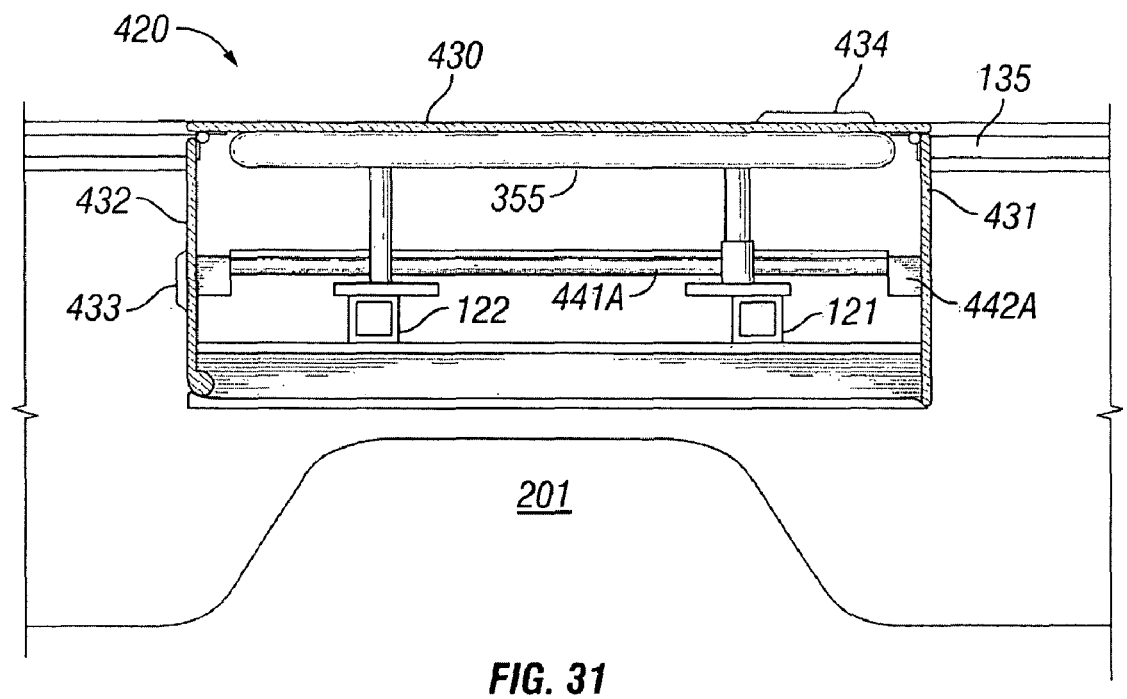
FIG. 31 is a cross-sectional view of the device cover illustrating the table positioned under the cover and the rails that support the chairs, table and umbrella.

FIG. 29 illustrates a back view of the cover 420 showing the two locking mechanisms 433. The cover 420 and device are positioned over the wheel wells 201, 202. FIG. 30 is a perspective view of the cover showing the hinge mechanisms 435 between the cover top 430 and the side 432. Also illustrated is the relationship of the cover 420 and the side bracket 131. FIG. 31 is a cross-sectional view of the cover and some of the device components protected by the cover. Illustrated is the table 355. The rails 121, 122 are also illustrated. Part of the cover locking mechanism is a rotatable shaft within an enclosure 441A extending from the back cover 432 to the front cover 431. The covered device is illustrated as being suspended above the truck rear wheel well 201.

FIG. 32 illustrates the same cross-sectional view but with the cover placed under the rails. The cover, comprising the top 430, and sides 431, 432 folded on the hinges 435, are held on a lip 461 fabricated to the side bracket 131 shown connected to the track system 135 of the pickup truck bed. The rails 121, 122 are again illustrated.

Figure 33:
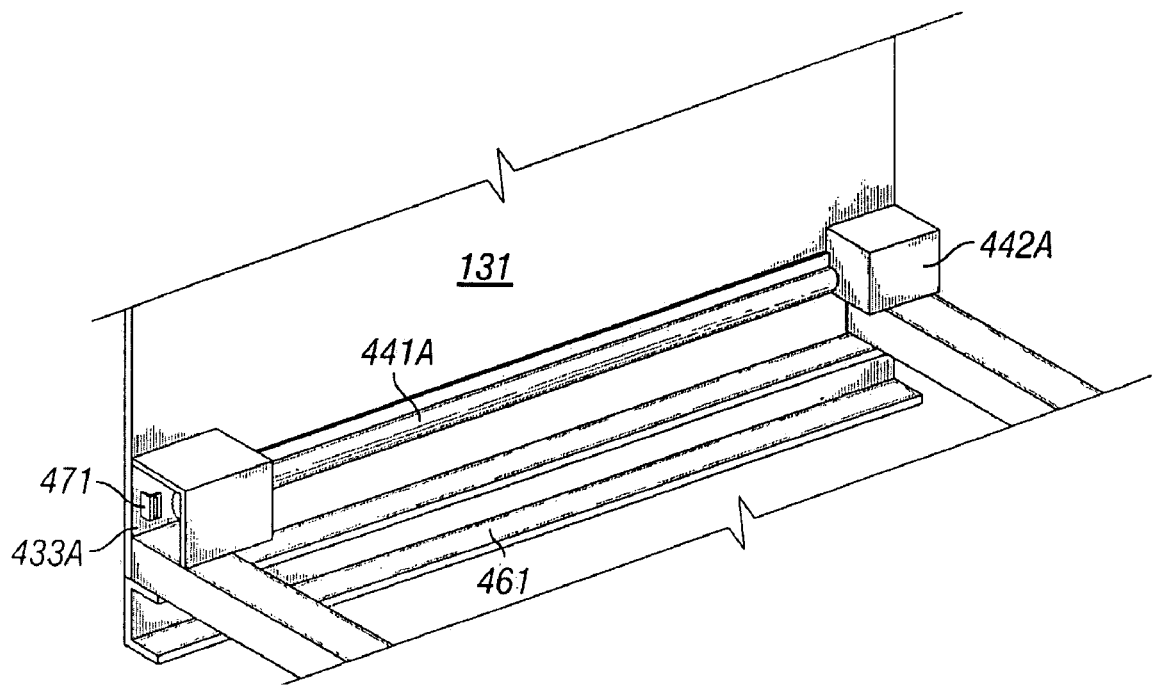
FIG. 33 illustrates a perspective view of the modified side bracket without the cover.
Figure 34:
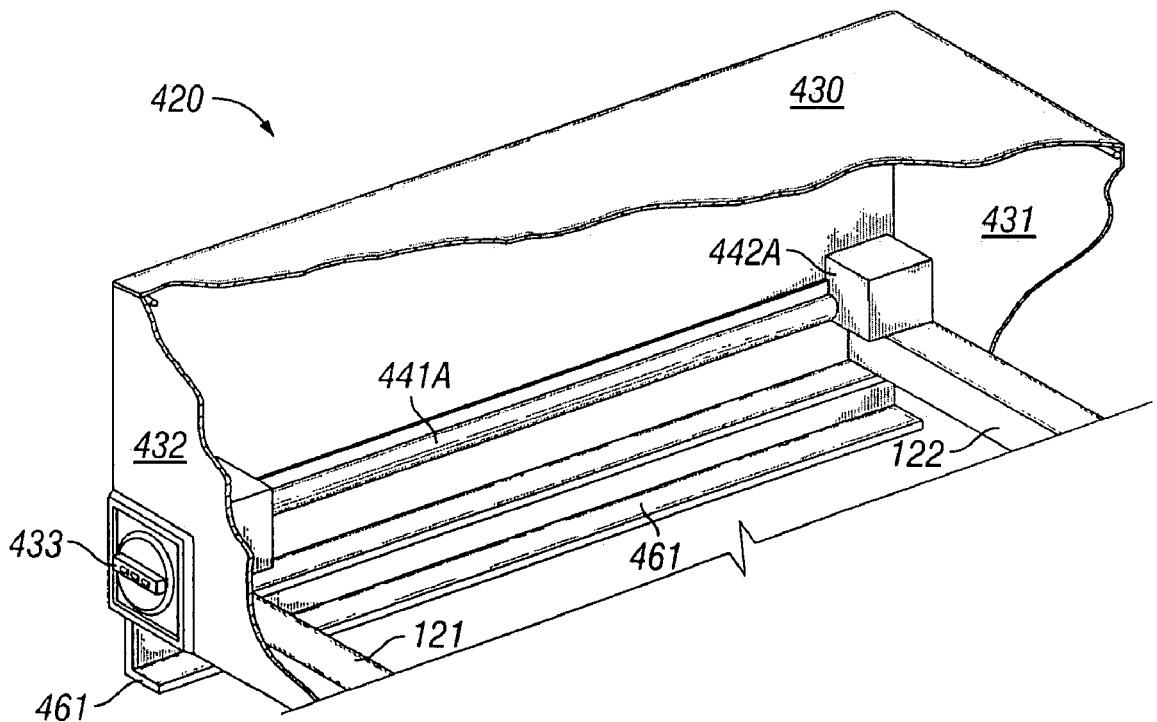
FIG. 34 illustrates a perspective view of the side bracket and cut away view of the device cover.

FIG. 33 illustrates a perspective view of the locking components including the back side latch 471 and back side mechanism 433A, enclosure for rotating shaft 441A and the front latching mechanism 442A. Also illustrated is the lip 461 attached to the side bracket 131. FIG. 34 illustrates the back cover 432, front cover 431 and the locking mechanism 433 attached to the back cover and controlling both the front and back latches.

Figure 35:
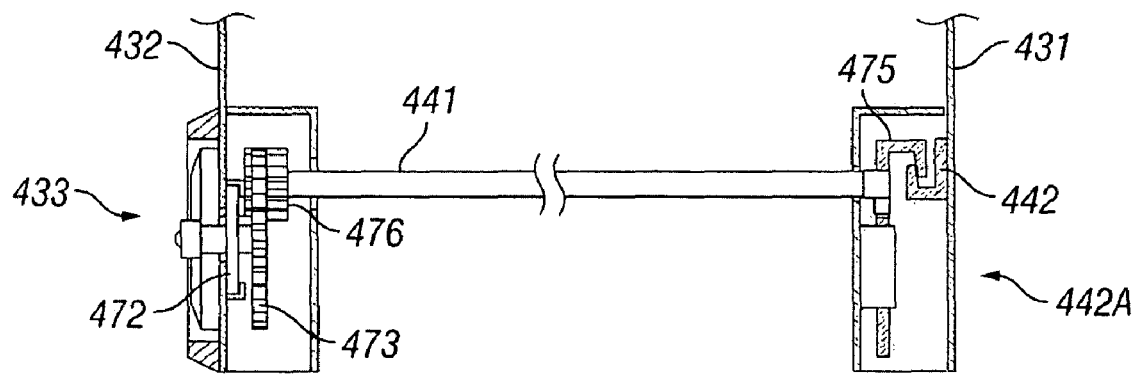
FIG. 35 illustrates a side cross-sectional view of the device cover locking mechanism.

FIG. 35 is a cross sectional view of the connective relationship of the lock 433 on the back cover side 432 and the latch mechanism 475, 442 of the front cover side 431. A key (not shown) can turn gear 473 that engages and rotates gear 476. This gear is connected to the rotating shaft 441 which engages a cam that controls the up and down movement of the latch 475 that in turn can engage the latch hook 442.

Figure 36:
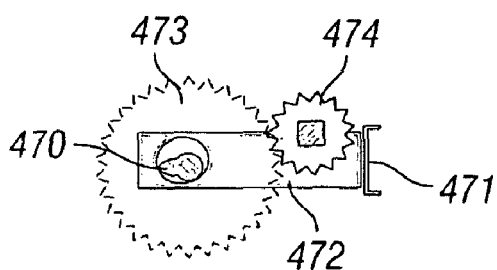
FIGS. 36 and 37 illustrate the locking mechanism for back cover panel.
Figure 37:
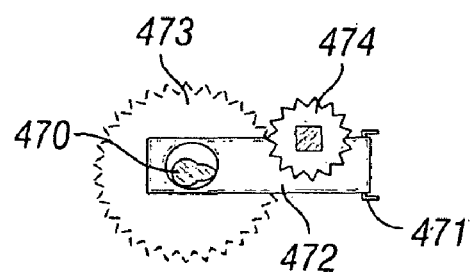
Figure 38:
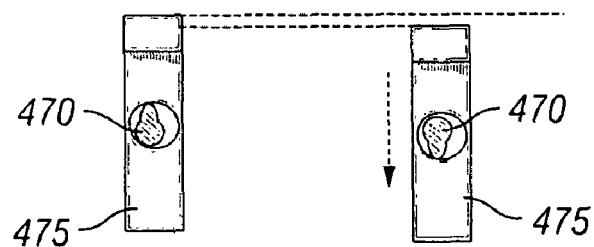
FIG. 38 illustrates the operation of the locking mechanism located on the back cover panel and the moveable locking latch mechanism on the front cover. panel.

FIGS. 36 and 37 illustrates the cam 470 operated lateral movement of latch 472 into the latch holder 472. The cam is also controlled by the keyed or combination lock. FIG. 38 illustrates the movement of the cam 470 controlling the front side latch. When engaged, the latch 475 moves downward, as shown by the arrow, to engage the latch hook 442 shown in FIG. 35.

In addition, this specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What I claim is:

1. A device for removable installation of seating in a pickup truck bed comprising a first bracket removeably attached to a first side track mounted to an inside wall of a truck bed side panel, a plurality of rails attached to the first bracket and that extend across elevated above and unsupported by the truck bed and are attached to a second bracket that attaches to a second side track mounted to an inside wall of a second truck bed side panel, and a chair mounted on the rails wherein a front frame of the chair is removeably attached to a first rail and a back frame of the chair is removeably attached to a second rail.

2. The seating device of claim 1 further comprising brackets attached to the truck bed floor.

3. The seating device of claim 1 further comprising height adjustable brackets.

4. The seating device of claim 1 wherein the seating device can be adjustably moved forward or backward in relation to a cab of a pickup truck.

5. The seating device of claim 1 further comprising a sleeve adjustably fitted into the rail.

6. The seating device of claim 1 further comprising an adjustable table.

7. The seating device of claim 6 further comprising a table that can be adjustably moved in a lateral direction toward either chair or forward or backward in relation to a cab of the pickup truck.

8. The seating device of claim 7 further comprising an umbrella stand.

9. The seating device of claim 1 further comprising the brackets moveably mounted on a track.

10. A device for removable installation of seating in a pickup truck bed comprising a first bracket removeably attached to a first side track mounted to an inside wall of a truck bed side panel, a first and second rail attached to the first bracket wherein the first and second rail are spaced apart to allow the first rail to support a front chair frame and the second rail to support a back chair frame and that extend across and above the truck bed and are attached to a second bracket that attaches to a second side track mounted to an inside wall of a second truck bed side panel, wherein the chairs are hingeably or removeably attached to the first and second rail.

11. A device for removable installation of seating in a pickup truck bed consisting of a first bracket removeably attached to a first side track mounted to an inside wall of a truck bed side panel, a first and second rail attached to the first bracket wherein the first and second rail are spaced apart to allow the first rail to support a front chair frame and the second rail to support a back chair frame and that extend across and above the truck bed and are attached to a second bracket that attaches to a second side track mounted to an inside wall of a second truck bed side panel, and a chair back and seat mounted on the rails wherein the chair back can fold onto the seat below the truck bed sides, a table with an umbrella stand and an umbrella.

* * * * *